(12) United States Patent
Liang et al.

(10) Patent No.: US 12,130,129 B2
(45) Date of Patent: Oct. 29, 2024

(54) PHASE UNWRAPPING USING SEGMENTATION

(71) Applicant: Arizona Board of Regents on Behalf of the University of Arizona, Tucson, AZ (US)

(72) Inventors: Rongguang Liang, Tucson, AZ (US); Junchao Zhang, Tucson, AZ (US); Xiaobo Tian, Tucson, AZ (US); Jianbo Shao, Tucson, AZ (US)

(73) Assignee: Arizona Board of Regents on Behalf of the University of Arizona, Tucson, AZ (US)

( * ) Notice: Subject to any disclaimer, the term of this patent is extended or adjusted under 35 U.S.C. 154(b) by 727 days.

(21) Appl. No.: 17/294,635

(22) PCT Filed: Nov. 18, 2019

(86) PCT No.: PCT/US2019/062050
§ 371 (c)(1),
(2) Date: May 17, 2021

(87) PCT Pub. No.: WO2020/102814
PCT Pub. Date: May 22, 2020

(65) Prior Publication Data
US 2022/0011097 A1    Jan. 13, 2022

Related U.S. Application Data

(60) Provisional application No. 62/768,624, filed on Nov. 16, 2018.

(51) Int. Cl.
*G01B 11/30* (2006.01)
*G06V 10/25* (2022.01)
(Continued)

(52) U.S. Cl.
CPC ............ *G01B 11/303* (2013.01); *G06V 10/25* (2022.01); *G06V 10/26* (2022.01); *G06V 10/30* (2022.01);
(Continued)

(58) Field of Classification Search
CPC .............. G01B 11/303; G01B 9/02078; G01B 9/02087; G01B 11/25; G01B 21/045;
(Continued)

(56) References Cited

U.S. PATENT DOCUMENTS

| 5,923,278 A | 7/1999 | Poehler et al. |
| 6,011,625 A | 1/2000 | Glass |

(Continued)

FOREIGN PATENT DOCUMENTS

| CN | 109541596 A | 3/2019 | |
| WO | WO-2019117453 A1 * | 6/2019 | ............. G01B 11/25 |

OTHER PUBLICATIONS

G. E. Spoorthi et al., PhaseNet 2.0: Phase Unwrapping of Noisy Data Based on Deep Learning Approach, 2020, IEEE Transactions on Image Processing, vol. 29, pp. 4862-4872 (Year: 2020).*

(Continued)

*Primary Examiner* — Mi'Schita' Henson
(74) *Attorney, Agent, or Firm* — Perkins Coie, LLP

(57) ABSTRACT

Methods, apparatus and systems for processing interferograms in metrology applications are described. In one example aspect, a method includes obtaining an input phase image based on the interferograms, segmenting the input phase image by classifying the input phase image into multiple regions based on the phase value and a location of each pixel, assigning an integer value to each of the multiple regions, and constructing an output phase image based on the input phase image and the phase offset of each of the multiple regions.

31 Claims, 22 Drawing Sheets interferograms

(51) Int. Cl.
  *G06V 10/26* (2022.01)
  *G06V 10/30* (2022.01)
  *G06V 10/75* (2022.01)
  *G06V 10/88* (2022.01)
  *G06V 10/94* (2022.01)

(52) U.S. Cl.
  CPC ............ *G06V 10/758* (2022.01); *G06V 10/88* (2022.01); *G06V 10/95* (2022.01)

(58) Field of Classification Search
  CPC ........ G06V 10/25; G06V 10/26; G06V 10/30; G06V 10/758; G06V 10/88; G06V 10/95; G06V 2201/121; G06V 10/82; G06F 2218/10
  See application file for complete search history.

(56) References Cited

U.S. PATENT DOCUMENTS

| | | | |
|---|---|---|---|
| 10,852,421 B1* | 12/2020 | Chartrand | G06T 5/70 |
| 2007/0206204 A1* | 9/2007 | Jia | G01B 11/2527 356/604 |
| 2015/0178905 A1 | 6/2015 | Fletcher et al. | |
| 2017/0241764 A1* | 8/2017 | Liu | G01B 11/2441 |

OTHER PUBLICATIONS

Yin et al., Temporal phase unwrapping using deep learning, 2019, Scientific Reports 9, article No. 20175, pp. 1-12, https://doi.org/10.1038/s41598-019-56222-3 (Year: 2019).*

Zuo et al., Deep learning in optical metrology: a review, Feb. 23, 2022, Light: Science & Applications 11, article No. 39, pp. 1-54, https://doi.org/10.1038/s41377-022-00714-x (Year: 2022).*

Cywińska et al., DeepOrientation: convolutional neural network for fringe pattern orientation map estimation, 2022, Optics Express, vol. 30, Issue 23, pp. 42283-42299 (Year: 2022).*

Machine Translation of Son in Foreign Patent Document JP_2001241930_A_I (Year: 2001).*

Machine Translation of Yan et al. in Foreign Patent Document CN 111043953 A (Year: 2020).*

Zhang, Junchao, et al., "Phase unwrapping via convolutional segmentation network", Optics Letters, pp. 1-5.

International Search Report and Written Opinion mailed Feb. 5, 2020 for International Patent Application No. PCT/US2019/062050 (9 pages).

* cited by examiner

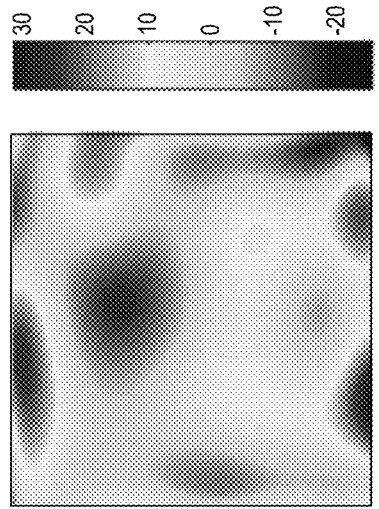
FIG. 3A
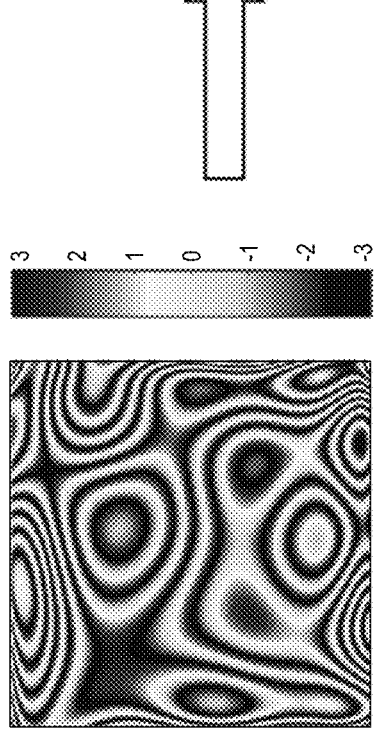
FIG. 3B
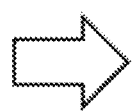
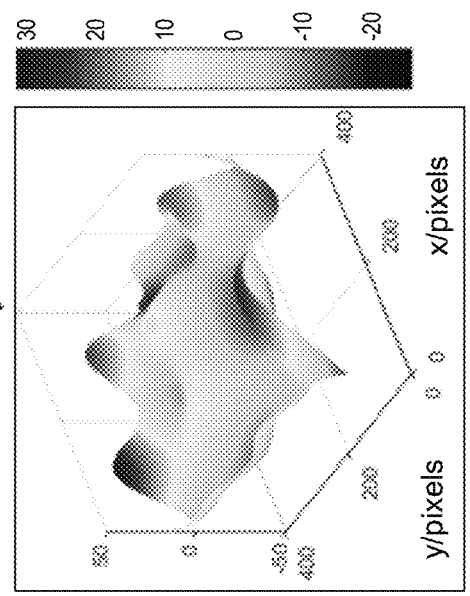
FIG. 3C
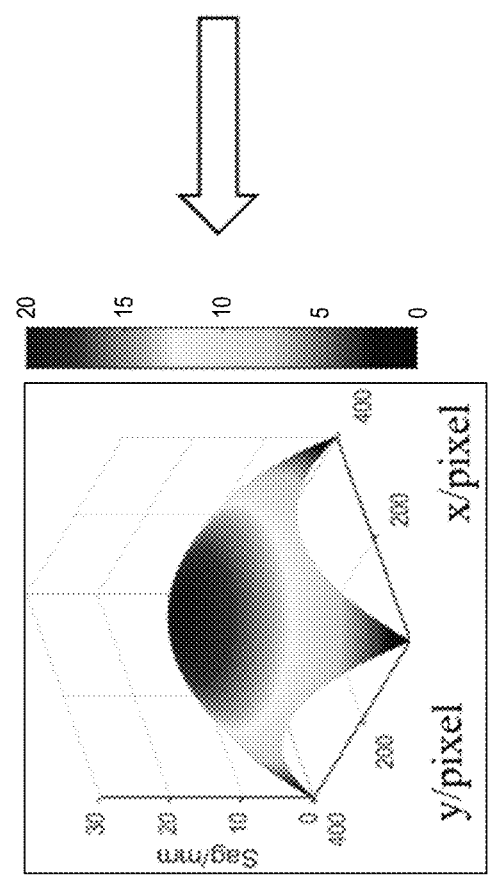
FIG. 3D

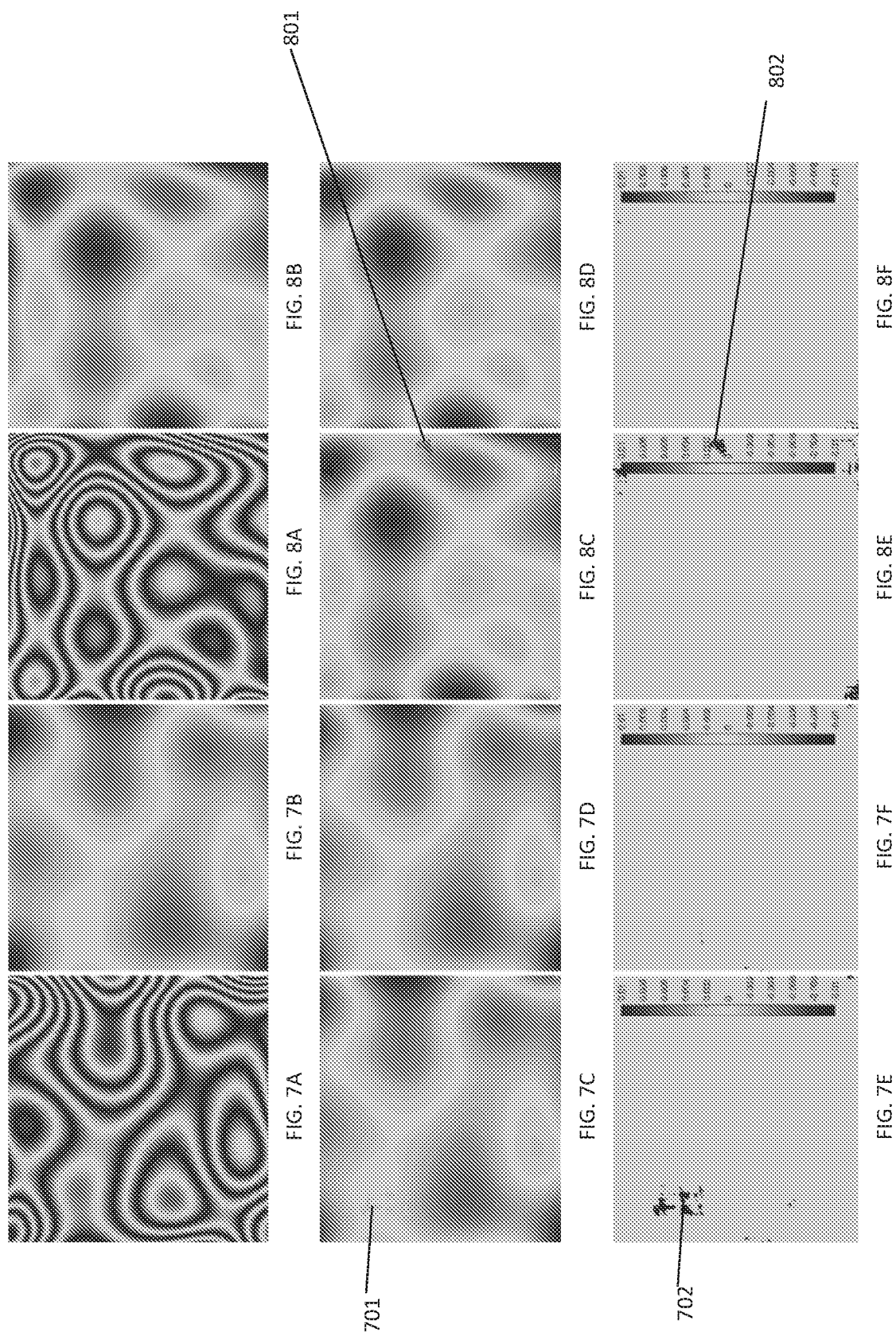

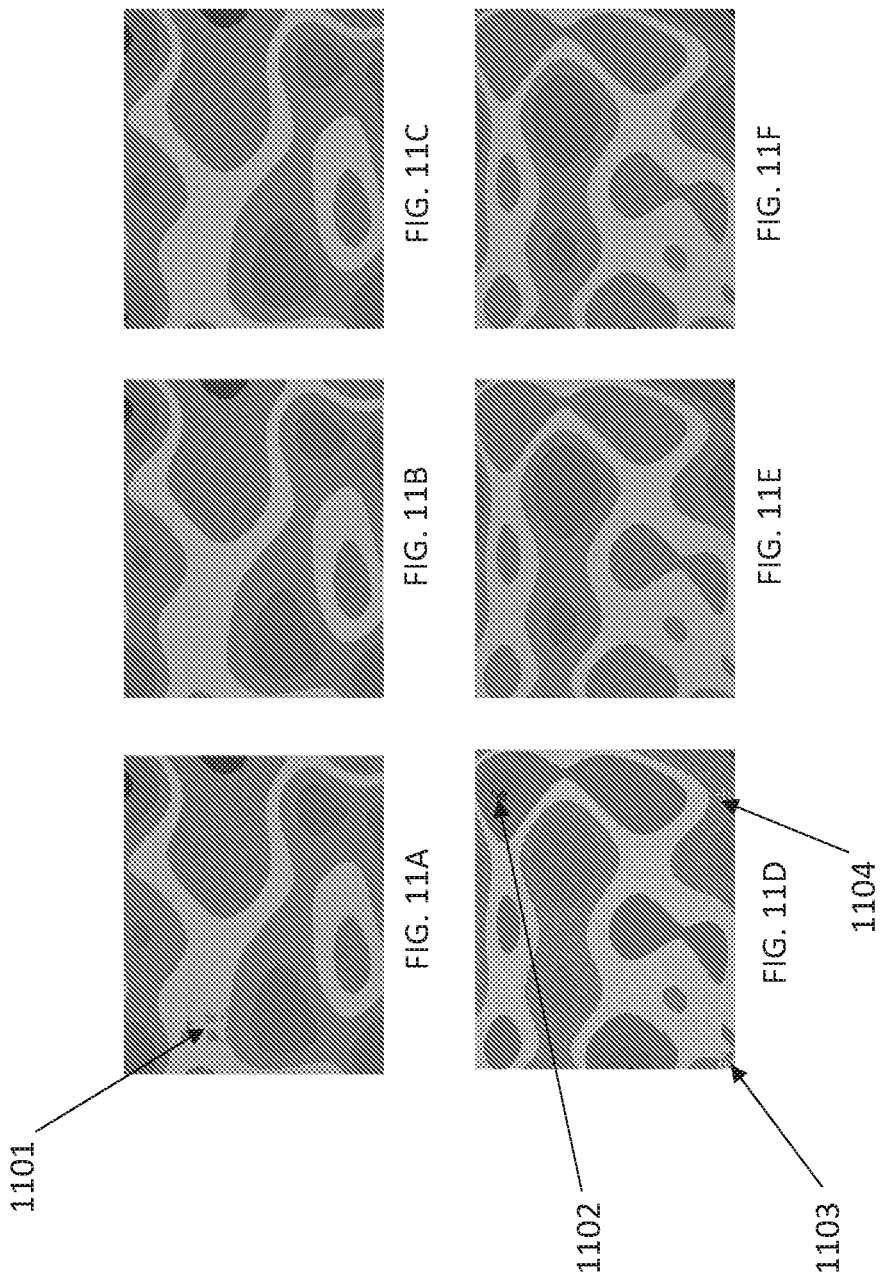

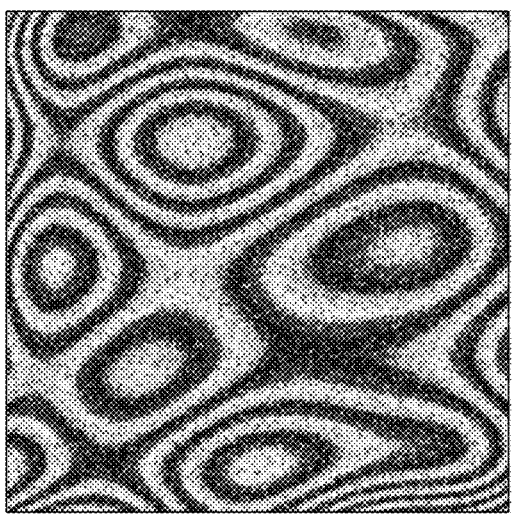
FIG. 13A
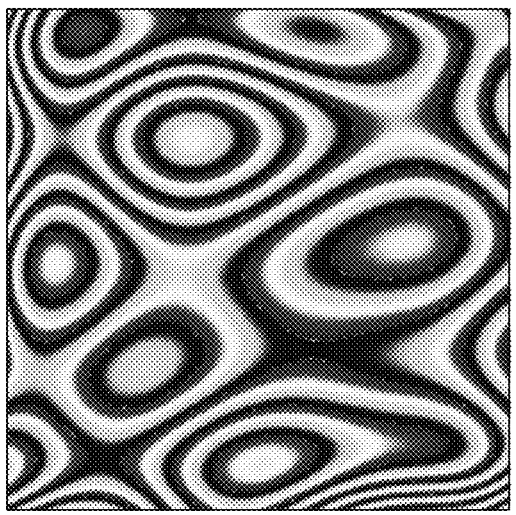
FIG. 13B
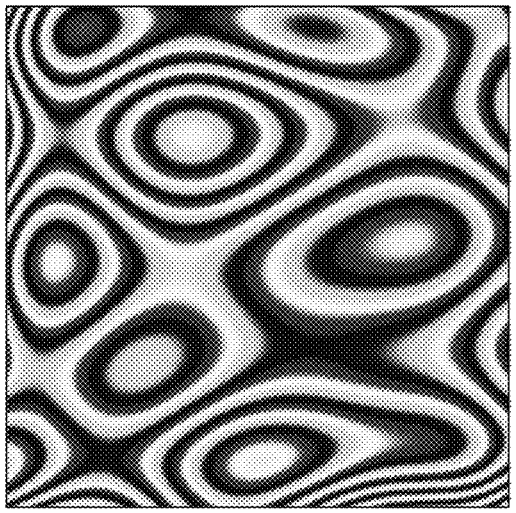
FIG. 13C
FIG. 13D
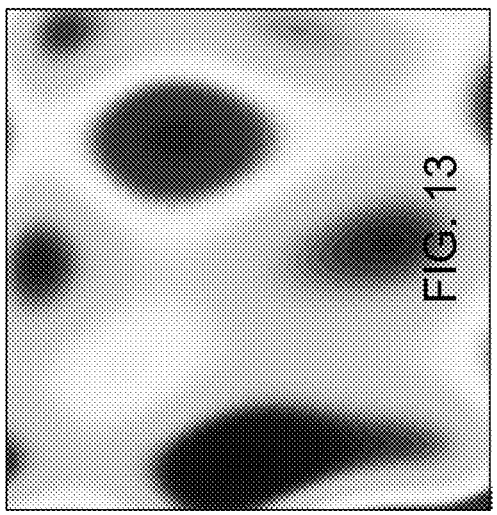
FIG. 13E
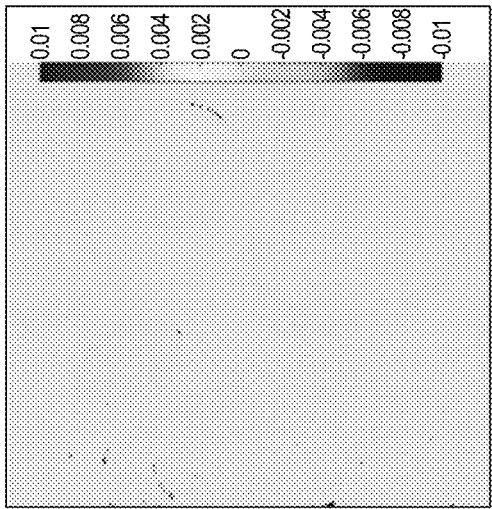
FIG. 13F
FIG. 13

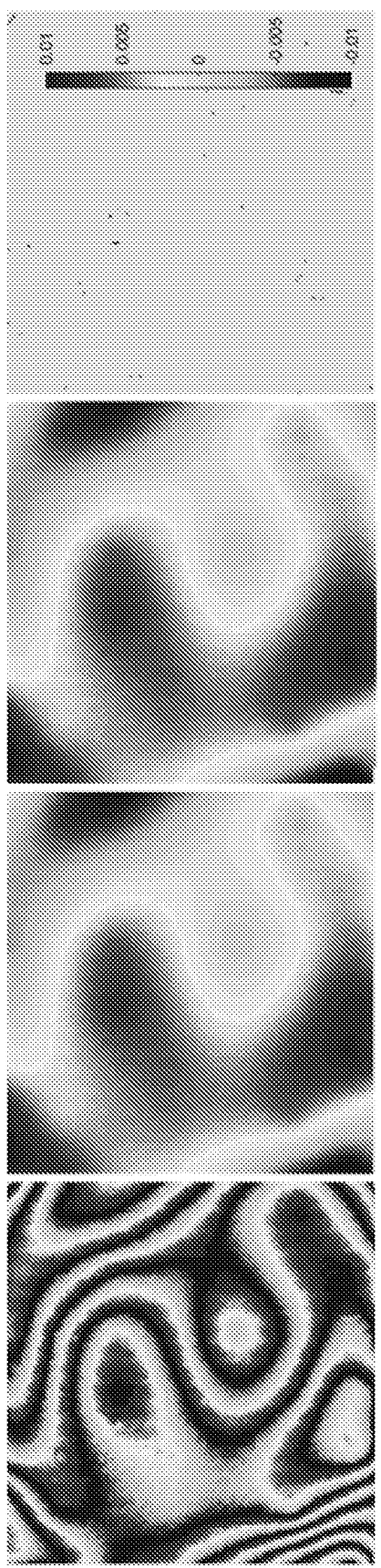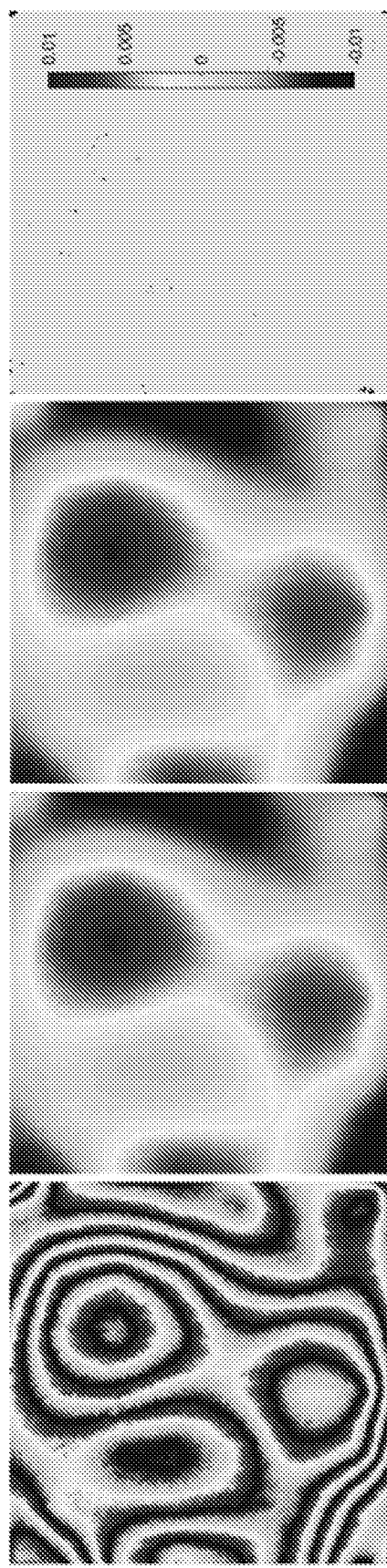

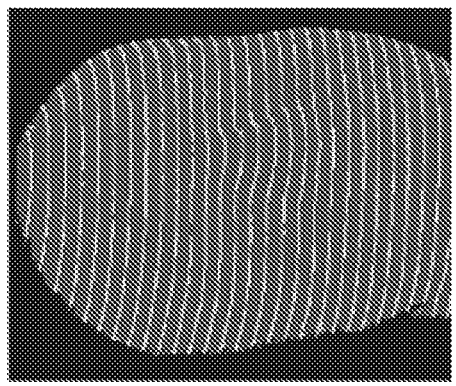
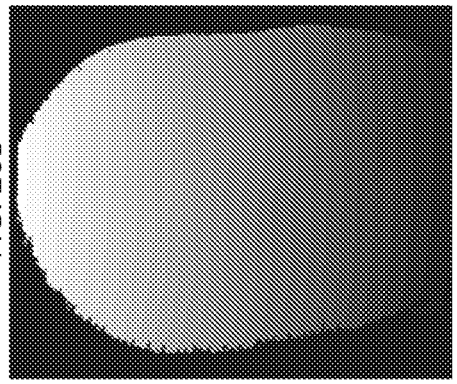
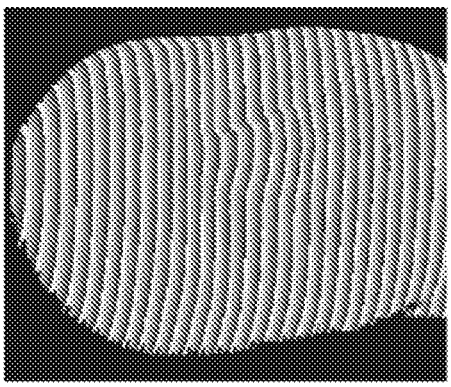
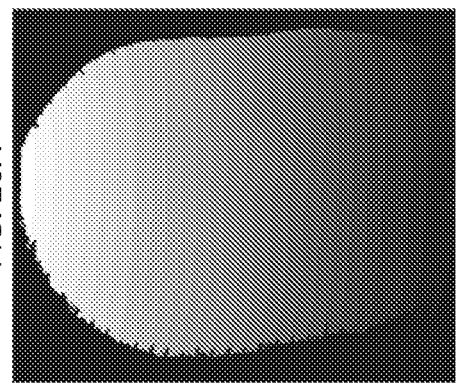
FIG. 20A
FIG. 20B
FIG. 20C
FIG. 20D

PHASE UNWRAPPING USING SEGMENTATION

CROSS REFERENCE TO RELATED APPLICATIONS

This patent document is a 371 National Phase Application of International Patent Application No. PCT/US2019/062050, filed Nov. 18, 2019, which claims priority to and benefits of U.S. Provisional Application 62/768,624, titled "PHASE UNWRAPPING USING SEGMENTATION," filed on Nov. 16, 2018. The entire disclosure of the aforementioned applications are incorporated by reference as part of the disclosure of this application.

TECHNICAL FIELD

This patent document relates to interferometry and fringe projection metrology, in particular, to removing ambiguity in wrapped phase to obtain the correct phase.

BACKGROUND

Interferometry is a family of techniques to extract information from waves that are superimposed causing the phenomenon of interference. Interferometry is widely used in various fields such as astronomy, fiber optics, metrology, oceanography, seismology, spectroscopy, quantum mechanics, nuclear and particle physics, plasma physics, remote sensing, biomolecular interactions, surface profiling, microfluidics, mechanical stress/strain measurement, velocimetry, and optometry.

Fringe projection technique is a commonly used three-dimensional (3D) measurement method for non-specular surfaces. By projecting a series of fringes on the object surfaces, phase can be obtained from a series of deformed fringes.

Phase unwrapping is an important step in both interferometry and fringe project metrology to remove the ambiguity in the wrapped phase to obtain the correct phase.

SUMMARY

This present document discloses systems and methods that can be used in various embodiments to facilitate reliable and accurate phase unwrapping in interferometry.

In one example aspect, a method for processing interferograms or deformed fringes is disclosed. The method includes obtaining an input phase image based on the interferograms or the deformed fringes. Each pixel of the input phase image is associated with a phase value. The method includes segmenting the input wrapped phase image by classifying the input wrapped phase image into multiple regions based on the phase value and a location of each pixel and assigning an integer value to each of the multiple regions. The integer value indicates that a corresponding region has a phase offset equal to a product of $2\pi$ and the integer value. The method also includes constructing an output phase image based on the phase value of each pixel and the phase offset of each of the multiple regions.

In another example aspect, a device for performing optical system design is disclosed. The device includes one or more processors and a memory including processor-executable instructions stored thereon. The processor-executable instructions upon execution by the one or more processors configure the one or more processors to obtain an input wrapped phase image based on the interferograms or the deformed fringes, each pixel of the input wrapped phase image associated with a phase value, segment the input phase image by classifying the input wrapped phase image into multiple regions based on the phase value and a location of each pixel, assign an integer value to each of the multiple regions, and construct an output phase image based on the phase value of each pixel and the phase offset of each of the multiple regions. The integer value indicates that a corresponding region has a phase offset equal to a product of $2\pi$ and the integer value.

In yet another example aspect, a computer-program storage medium is disclosed. The computer-program storage medium includes code stored thereon. The code, when executed by a processor, causes the processor to implement a method that comprises obtaining an input wrapped phase image based on the interferograms or the deformed fringes, wherein each pixel of the input phase image is associated with a phase value; segmenting the input phase image by classifying the input phase image into multiple regions based on the phase value and a location of each pixel; assigning an integer value to each of the multiple regions, wherein the integer value indicates that a corresponding region has a phase offset equal to a product of $2\pi$ and the integer value; and constructing an output phase image based on the phase value of each pixel and the phase offset of each of the multiple regions.

These, and other, aspects are described in the present document.

BRIEF DESCRIPTION OF THE DRAWINGS

FIG. 3A illustrates an example of a phase-wrapped image.

FIG. 3B illustrates an example of a phase-unwrapped image corresponding to FIG. 3A.

FIG. 3C illustrates an example of phase-unwrapped three-dimensional model corresponding to FIG. 3B.

FIG. 3D illustrates an example of the wavefront reconstructed from the phase-unwrapped image shown in FIG. 3C.

FIG. 7A illustrates another example of wrapped phase input.

FIG. 7B illustrates an example ground-truth of the unwrapped phase corresponding to the input shown in FIG. 7A.

FIG. 7C illustrates an example of reconstructed unwrapped phase based on the input shown in FIG. 7A in accordance with one or more embodiments of the present technology.

FIG. 7D illustrates an example of post-processed reconstructed unwrapped phase based on the input shown in FIG. 7A in accordance with one or more embodiments of the present technology.

FIG. 7E illustrates an example difference between the reconstructed unwrapped phase shown in FIG. 7C and the corresponding ground-truth shown in FIG. 7B.

FIG. 7F illustrates an example difference between the post-processed reconstructed unwrapped phase shown in FIG. 7D and the corresponding ground-truth shown in FIG. 7B.

FIG. 8A illustrates yet another example of wrapped phase input.

FIG. 8B illustrates an example ground-truth of the unwrapped phase corresponding to the input shown in FIG. 8A.

FIG. 8C illustrates an example of reconstructed unwrapped phase based on the input shown in FIG. 8A in accordance with one or more embodiments of the present technology.

FIG. 8D illustrates an example of post-processed reconstructed unwrapped phase based on the input shown in FIG. 8A in accordance with one or more embodiments of the present technology.

FIG. 8E illustrates an example different between the reconstructed unwrapped phase shown in FIG. 8C and the corresponding ground-truth shown in FIG. 8B.

FIG. 8F illustrates an example different between the post-processed reconstructed unwrapped phase shown in FIG. 8D and the corresponding ground-truth shown in FIG. 8B.

FIG. 11A illustrates an initial network output corresponding to FIG. 7A in accordance with one or more embodiments of the present technology.

FIG. 11B illustrates an output after a post-processing operation based on FIG. 11A in accordance with one or more embodiments of the present technology.

FIG. 11C illustrates an example ground-truth corresponding to FIG. 11A and FIG. 11B.

FIG. 11D illustrates an initial network output corresponding to FIG. 8A in accordance with one or more embodiments of the present technology.

FIG. 11E illustrates an output after a post-processing operation based on FIG. 11D in accordance with one or more embodiments of the present technology.

FIG. 11F illustrates an example ground-truth corresponding to FIG. 11D and FIG. 11E.

FIG. 13A illustrates another example of noisy wrapped phase input.

FIG. 13B illustrates an example of denoised wrapped phase based on the input shown in FIG. 13A in accordance with one or more embodiments of the present technology.

FIG. 13C illustrates an example ground-truth of wrapped phase corresponding to FIG. 13A.

FIG. 13D illustrates an example of reconstructed unwrapped phase based on the input shown in FIG. 13A in accordance with one or more embodiments of the present technology.

FIG. 13E illustrates an example ground-truth of unwrapped phase corresponding to FIG. 13D.

FIG. 13F illustrates an example difference between the reconstructed unwrapped phase shown in FIG. 13D and the corresponding ground-truth shown in FIG. 13E.

FIG. 14A illustrates an example wrapped phase obtained by an interferometer setup.

FIG. 14B illustrates an example reconstructed unwrapped phase based on the input shown in FIG. 14A in accordance with one or more embodiments of the present technology.

FIG. 14C illustrates an example ground-truth corresponding to the input shown in FIG. 14A.

FIG. 14D illustrates an example difference between the reconstructed unwrapped phase shown in FIG. 14B and the corresponding ground-truth shown in FIG. 14C.

FIG. 14E illustrates another example wrapped phase obtained by an interferometer setup.

FIG. 14F illustrates an example reconstructed unwrapped phase based on the input shown in FIG. 14E in accordance with one or more embodiments of the present technology.

FIG. 14G illustrates an example ground-truth corresponding to the input shown in FIG. 14E.

FIG. 14H illustrates an example difference between the reconstructed unwrapped phase shown in FIG. 14F and the corresponding ground-truth shown in FIG. 14G.

FIG. 20A an example of fringe projection input obtained using a human head model.

FIG. 20B illustrates an output phase feature map with corresponding labels in accordance with one or more embodiments of the present disclosure.

FIG. 20C illustrates an example integer map determined based on the fringe projection input shown in FIG. 20A and the phase feature map shown in FIG. 20B in accordance with one or more embodiments of the present disclosure.

FIG. 20D illustrates the final unwrapped phase in accordance with one or more embodiments of the present disclosure.

DETAILED DESCRIPTION

Interferometry makes use of the principle of superposition to combine waves in a way that causes the result to have some properties indicative of the original state of the waves. When two waves with the same frequency combine, the resulting intensity pattern is determined by the phase difference between the two waves: waves that are in phase undergo constructive interference while waves that are out of phase undergo destructive interference. Waves which are not completely in phase nor completely out of phase have an intermediate intensity pattern, which can be used to determine their relative phase difference.

Figure 1:
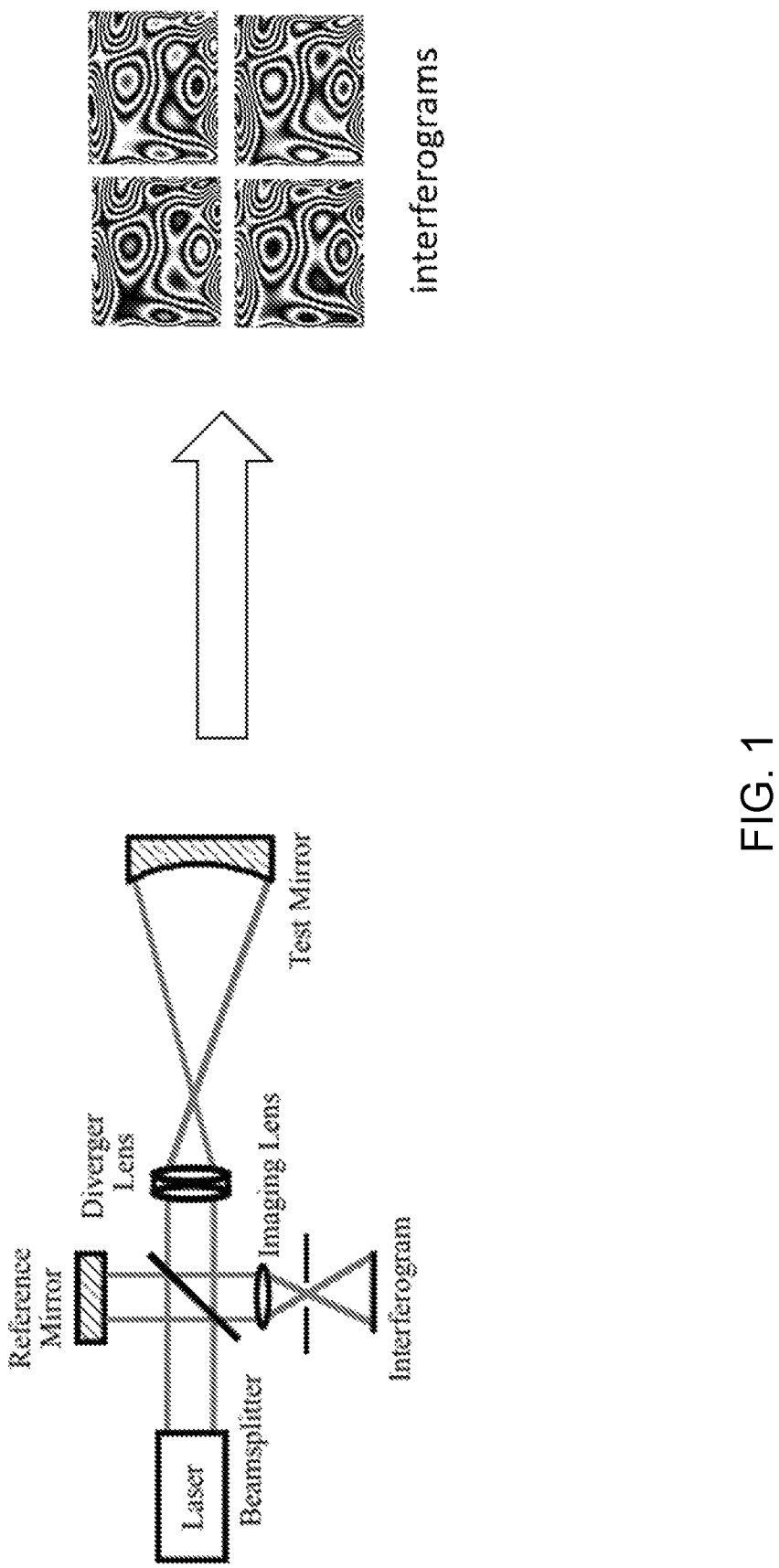
FIG. 1 is a schematic diagram illustrating an example interferometer setup.

Interferometry is frequently used in the optical industry for examining surface characteristics of a lens. For example, the quality of the surfaces can be tested using interferometry as the surfaces are being shaped and configured. FIG. 1 is a schematic diagram illustrating an example interferometer setup. For example, interferograms are generated by making measurements of the signal at many discrete positions of a mirror.

Phase-shifting interferometry is a means of analyzing interferograms to recover the phase information. Phase-shifting interferometry enables a point-by-point reconstruction of the wavefront as follows:

$$I(x, y; \theta) = I'(x, y) + I''(x, y)\cos[\varphi(x, y) + \theta] \quad \text{Eq. (1)}$$

In Eq. (1), there are three unknowns in the interferogram irradiance pattern. I' and I'' are background intensity and modulation amplitude, φ is the phase to measure, and θ is the phase shift. The latter unknown is of primary interest since it encodes the Optical Path Difference (OPD) between the reference and test wavefronts. The algorithms used in phase-shifting interferometry involve the arctangent function. For 4 step phase shifting method, the equation to calculate the phase is shown in Eq. (2)

$$\varphi_w = \arctan\left(\frac{I_3 - I_1}{I_0 - I_2}\right) \quad \text{Eq. (2)}$$

Figures 2A, 2B:
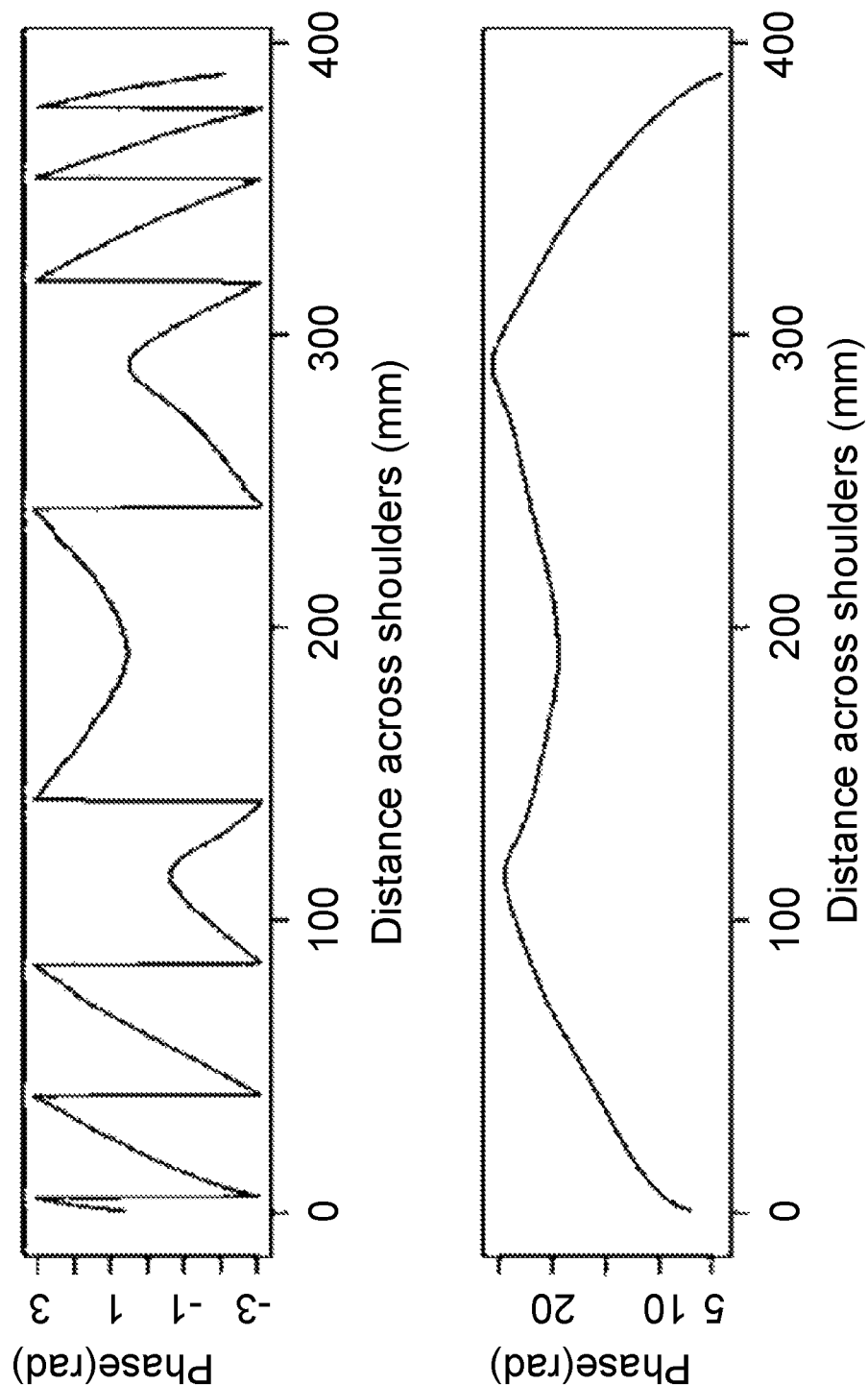
FIG. 2A illustrates an example of one-dimensional phase wrapping caused by the ambiguity of the arctangent function.
FIG. 2B illustrates an example of an unwrapped phase corresponding to FIG. 2A.

The arctangent function has an inherent ambiguity—as multiples of 2π can be added to a given term, the arctangent will return the same result. If the phase function exceeds the range of −π to π, the phase values are wrapped back down. FIG. 2A shows an example of one-dimensional phase wrapping caused by the ambiguity of the arctangent function. Each sharp transition at the top or bottom sections of the plot in FIG. 2A is due to phase wrapping. FIG. 2B shows an example of an unwrapped phase corresponding to FIG. 2A, which is obtained by adding or subtracting the value 2π to the phase value at each discontinuity.

FIGS. 3A-3D demonstrate an example phase unwrapping process to reconstruct the wavefront. FIG. 3A shows an example of a phase-wrapped image. FIG. 3B shows an example of the phase-unwrapped image corresponding to FIG. 3A. FIG. 3C shows an example of phase-unwrapped three-dimensional model corresponding to FIG. 3B. FIG. 3D shows an example of the wavefront reconstructed from the phase-unwrapped image.

The phase unwrapping procedure can be construed as adding or subtracting an integer multiple, n, of 2π at each pixel of the wrapped phase to obtain an unwrapped phase. The terms integral multiple and integer multiple are used interchangeably in this document. Conventional phase unwrapping approaches are time-consuming and noise sensitive. This patent document discloses techniques that can be implemented to obtain unwrapped phase using segmentation approaches. The techniques are also robust against noises in the input data, thereby providing fast and reliable unwrapped phase results.

The phase unwrapping process aims to determine the integer multiple, n, of 2π that is to be added to or subtracted from the wrapped phase to obtain the correct phase value, as defined in Eq. (3).

$$\varphi_{unw}(x, y) = \varphi_w(x, y) + 2\pi \times n(x, y) \quad \text{Eq. (3)}$$

Figure 4:
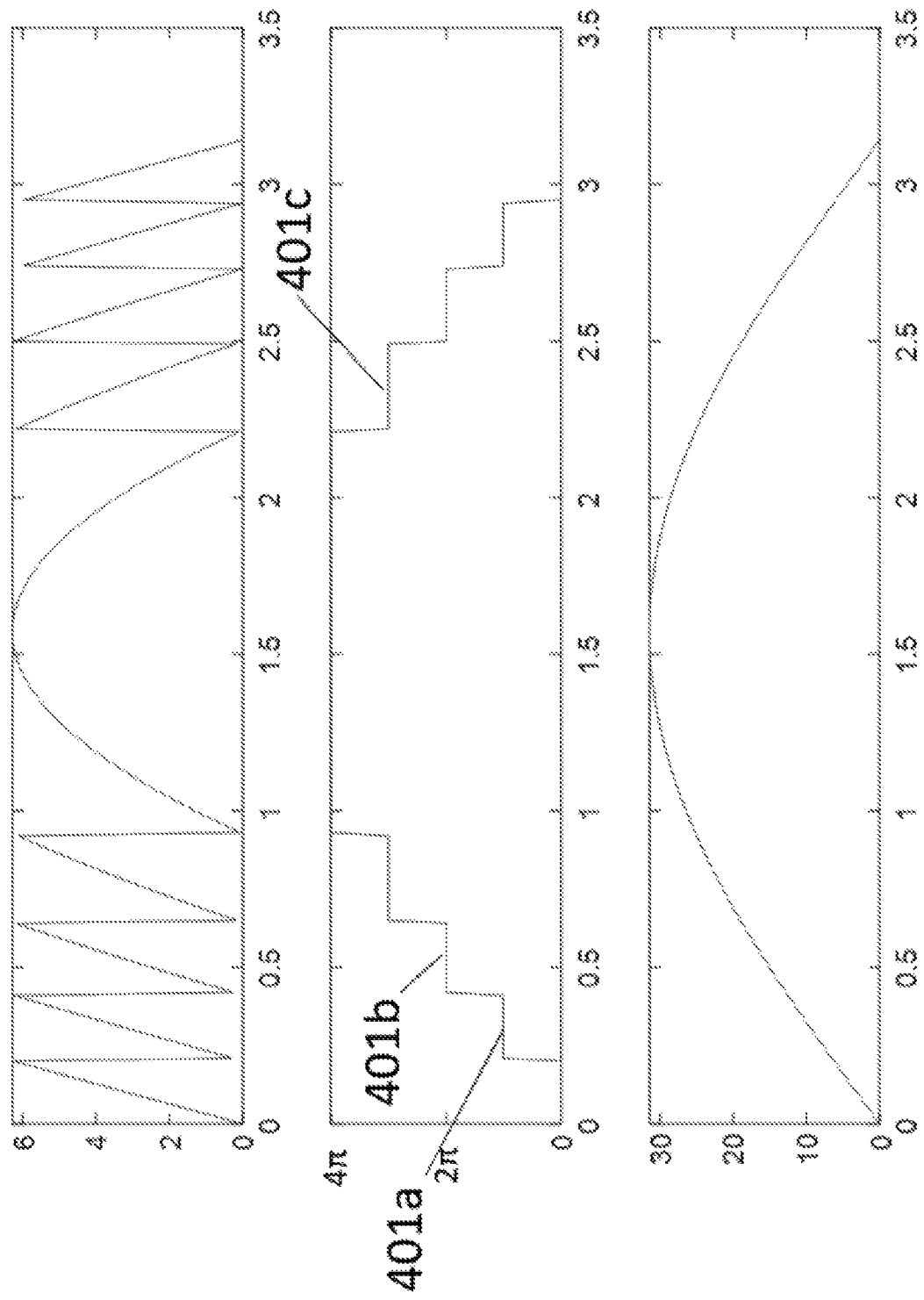
FIG. 4 illustrates an example diagram of obtaining multiple classes based on a phase-wrapped input in accordance with one or more embodiments of the present technology.

Here, (x, y) is a position in an input space of H×W, $\varphi_w$, $\varphi_{unw} \in \mathbb{R}^{H \times W}$ and n∈{0, ±1, ±2, ±3, . . . }. Phase unwrapping can be deemed as a multi-class classification problem, where an integral multiple represents a class. FIG. 4 shows a simplified example diagram for producing a phase-unwrapped result (bottom diagram) using multiple classes 401a, 401b, 401c that can be added to a phase-wrapped input (top diagram) to carry out the phase unwrapping in accordance with one or more embodiments of the present technology.

Figure 5:
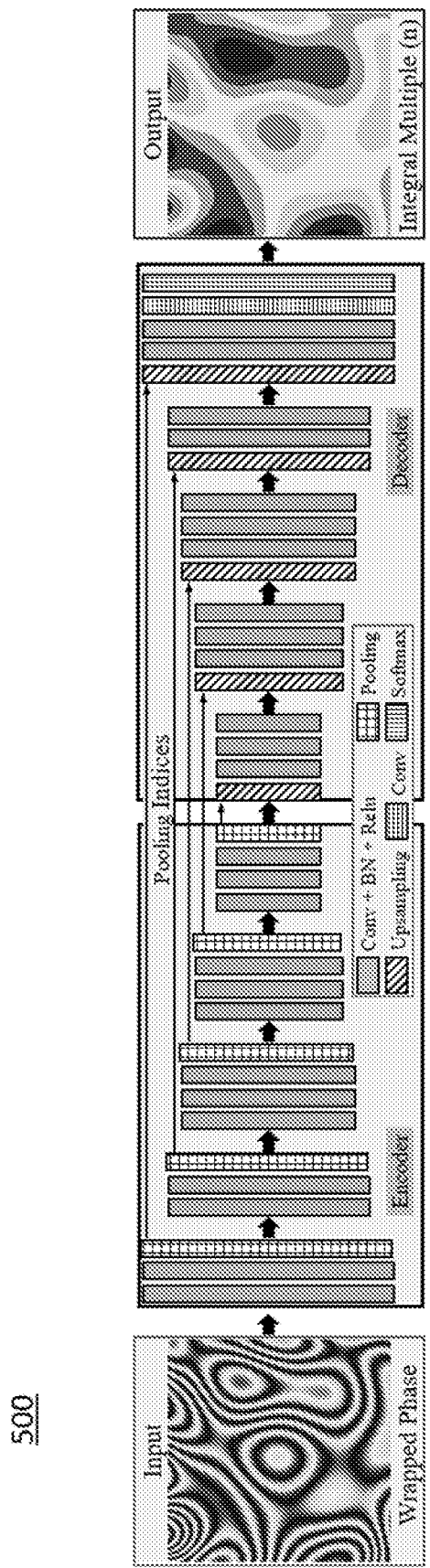
FIG. 5 illustrates an example segmentation network in accordance with one or more embodiments of the present technology.

In achieving a classification of the phase-wrapped input, techniques that utilize neural networks can be used. For example, a convolutional neural network (CNN) can be trained and used to obtain the integer values are needed to perform phase unwrapping. FIG. 5 shows an example segmentation neural network 500 in accordance with one or more embodiments of the present technology. The network takes the wrapped phase as inputs and outputs the corresponding integral multiples. In some embodiments, the network includes an encoder path and a decoder path, followed by a final pixel-wise classification layer. In some embodiments, a constant kernel size of 3-by-3 for all convolutional layers is used. Each encoder layer in the encoder path includes at least one of the following operations: convolution (Conv), batch normalization (BN), or rectified linear unit (Relu). A convolution operation is a well-known mathematical operation on two functions to produce a third function that expresses how the shape of one is modified by the other. Batch normalization is a technique for improving the performance and stability of artificial neural networks—for example, it can provide any layer in a neural network with inputs that are zero mean/unit variance. In the context of artificial neural networks, a unit employing a rectifier is called a rectified linear unit, and a rectifier is an activation function defined as the positive part of its argument: $f(x)=x^+=\max(0, x)$, where x is the input to a neuron. The rectifier is also known as a ramp function and is analogous to half-wave rectification in electrical engineering.

In some embodiments, a max-pooling operation with a 2-by-2 window and stride 2 is used to reduce the dimension of feature maps and achieve translation invariance over small spatial shifts. Max pooling is a sample-based discretization process to down-sample an input representation, reducing its dimensionality, and allowing for assumptions to be made about features contained in the sub-regions binned. The encoder path can include multiple encoder layers designed for object classification. Each encoder layer has a corresponding decoder layer. For example, the encoder path and the decoder path can each include 13 layers. A up-sampling operation can be performed on feature maps before the feature maps go through a decoder layer. This operation is to up-sample input feature maps using the memorized max-pooling indices from the corresponding max-pooling operation in the encoder path. Finally, the high dimensional feature representation is fed into a convolutional layer and a soft-max classifier to produce a N-channel image of probability, where N is the number of classes. The output n corresponds to the class with maximum probability at each pixel.

In some embodiments, the network can employ 9 to 20 different layers in the encoder and/or decoder paths. In some embodiments, the number of layers in the encoder and/or decoder paths is related to the input size. For example, the input size is M by M pixels. The size changes to M/2 by M/2 after max-pooling. After n max-pooling (or convolutional layer), size changed to $M/2^n$ by $M/2^n$. Because filter size is t-by-t (e.g., the constant kernel size of 3-by-3 or larger), it is desirable to maintain that $M/2^n \geq t$. Thus, in some embodiments, the maximum number of convolutional layers is $$\log_2 \frac{M}{t}.$$

In some embodiments, such formulation can be used when one convolutional layer is followed by a max-pooling layer.

Figure 6A:
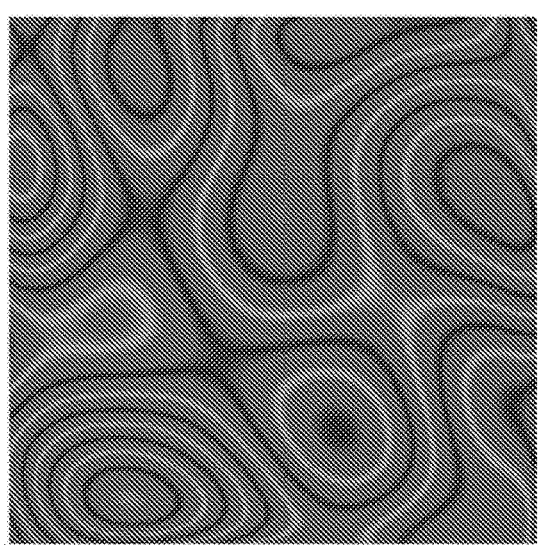
FIG. 6A illustrates an example of wrapped phase input.
Figure 6B:
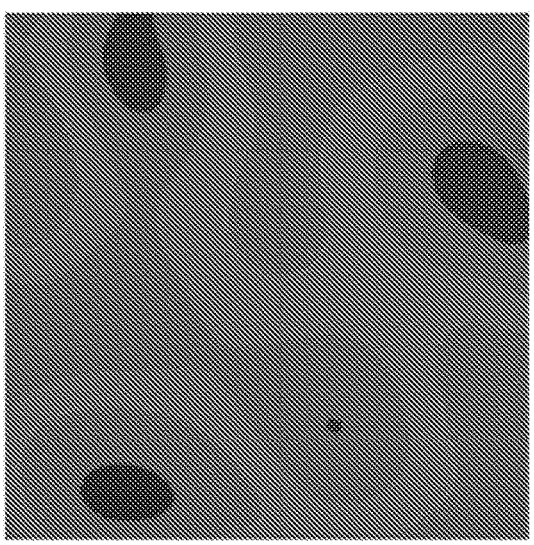
FIG. 6B illustrates an example of classified regions based on the input shown in FIG. 6A in accordance with one or more embodiments of the present technology.
Figure 6C:
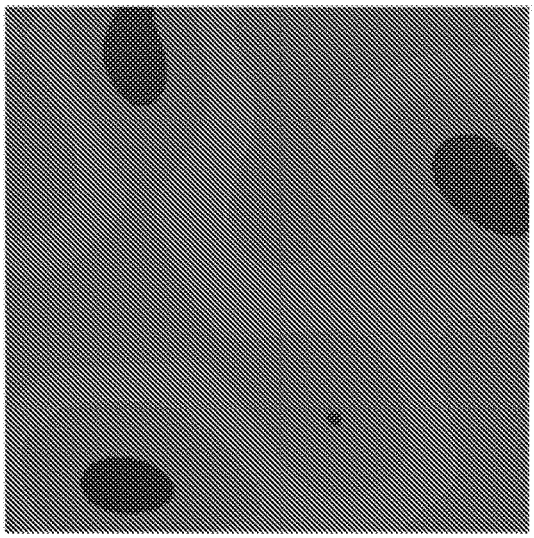
FIG. 6C illustrates an example ground-truth of the regions corresponding to the input shown in FIG. 6A.
Figure 6D:
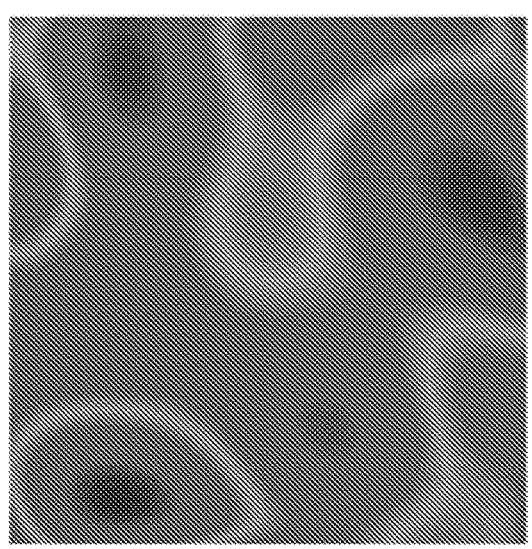
FIG. 6D illustrates an example of reconstructed unwrapped phase based on the input shown in FIG. 6A in accordance with one or more embodiments of the present technology.
Figure 6E:
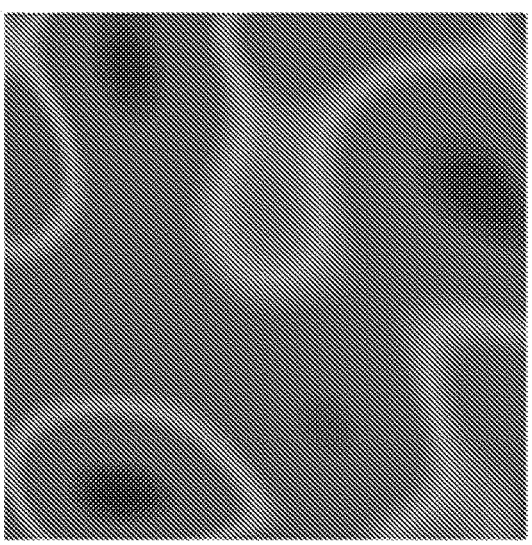
FIG. 6E illustrates an example ground-truth of the unwrapped phase corresponding to the input shown in FIG. 6A.
Figure 6F:
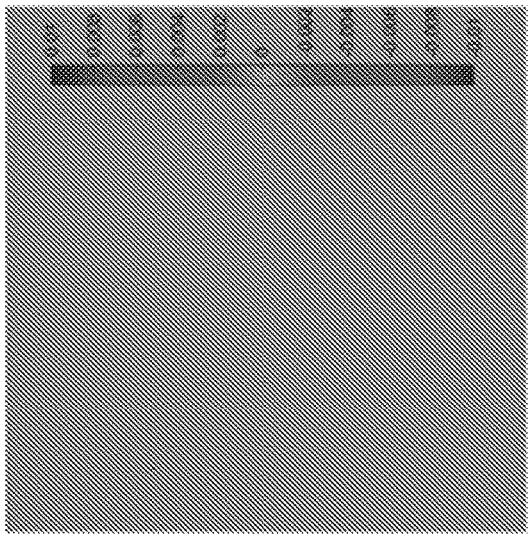
FIG. 6F illustrate an example difference between the reconstructed unwrapped phase shown in FIG. 6D and the corresponding ground-truth shown in FIG. 6E.

In some embodiments, the network can be trained using a set of training data. For example, in one specific embodiment, 1000 pairs of simulated data (wrapped and unwrapped phases) with size of 400-by-400 were generated, where 9500 pairs were used for training and the rest was used for testing. FIGS. 6A-6F shows an example of experimental results based on simulated clean data in accordance with one or more embodiments of the present technology. The wrapped phase in FIG. 6A was fed into the network as an input. The network output (e.g., classified regions) and reconstructed unwrapped phase are shown in FIG. 6B and FIG. 6D, respectively. The ground-truth of the regions and the unwrapped phase based on the ground truth are shown in FIG. 6C and FIG. 6E, respectively. The difference between reconstructed unwrapped phase and the corresponding ground-truth is shown in FIG. 6F. As shown in FIG. 6F, for simulated clean data, the trained network can produce good results with little error.

In order to facilitate the understanding of the disclosed technology in the description below, subheadings are used in various sections. It should be noted, however, that the description that follows each subheading can be pertinent to the features that are described in other sections of this document.

Contour Training

While simulated clean data has demonstrated that the techniques described herein are well suited to provide a phase-unwrapped output, real data is seldom clean—various types of noises can be present in the phase-wrapped input. FIGS. 7A-8F show two examples of misclassifications due to noises and other factors present in the input. As shown in FIG. 7C and FIG. 8C, there are corrupted regions 701, 801 in unwrapped phases due to misclassifications. FIGS. 7E and 8E also show these corrupted regions 702, 802 when comparing FIG. 7C and FIG. 8C with the corresponding ground-truths in FIG. 7D and FIG. 8D.

To improve the classification accuracy, a post-processing operation can be performed on the network output. The post-processing operation includes identifying the phase discontinuity locations in the input—those locations play an important role in phase unwrapping by providing additional information for the classification of the regions. The discontinuity locations are then used to post-process the initial classified regions. For example, FIG. 7D and FIG. 8D illustrate example post-processed reconstructed unwrapped phases corresponding to FIG. 7A and FIG. 8A.

Figure 9:
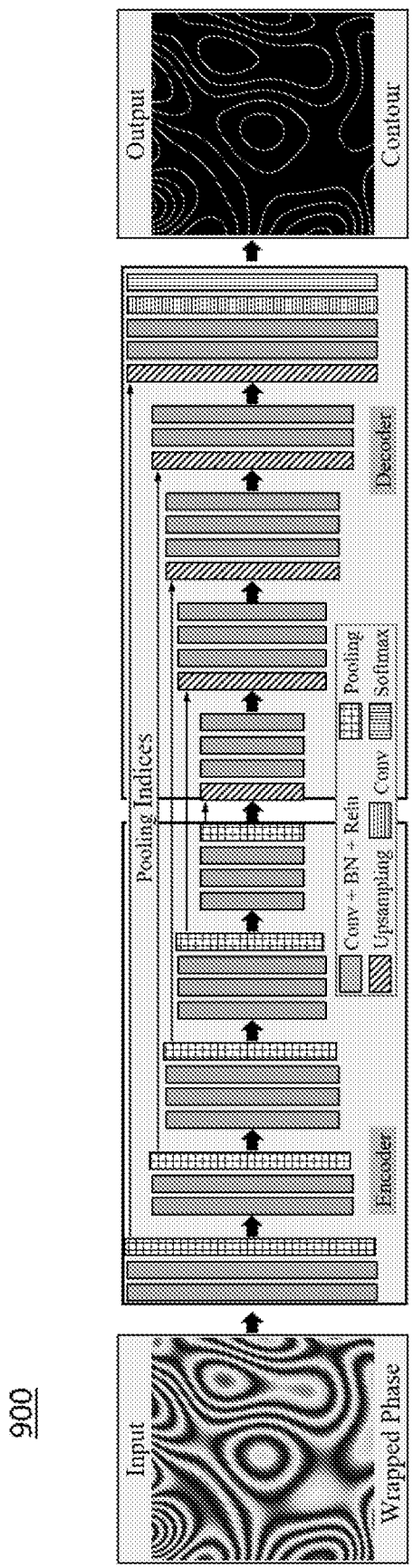
FIG. 9 illustrates an example network for identifying phase discontinuity in accordance with one or more embodiments of the present technology.
Figures 10A, 10B, 10C, 10D:
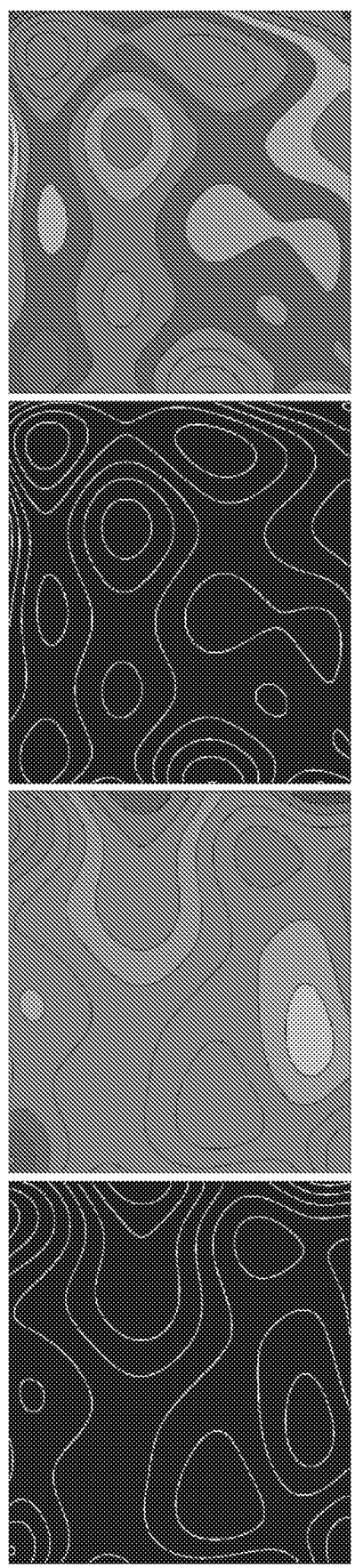
FIG. 10A illustrates example phase discontinuity corresponding to reconstructed unwrapped phase shown in FIG. 7C in accordance with one or more embodiments of the present technology.
FIG. 10B illustrates example classified regions corresponding to reconstructed unwrapped phase shown in FIG. 7C in accordance with one or more embodiments of the present technology.
FIG. 10C illustrates example phase discontinuity corresponding to reconstructed unwrapped phase shown in FIG. 8C in accordance with one or more embodiments of the present technology.
FIG. 10D illustrates example classified regions corresponding to reconstructed unwrapped phase shown in FIG. 7C in accordance with one or more embodiments of the present technology.

In some embodiments, the identification of phase discontinuity can be done by the same network as described above. FIG. 9 shows an example network 900 for identifying phase discontinuity in accordance with one or more embodiments of the present technology. The phase discontinuity task can be considered as a two-class classification problem. Therefore, the final classification layer of the network can be changed to predict a two-class problem. Correspondingly, binary images of phase discontinuity can be treated as ground-truth to train the network.

FIGS. 10A-10D show two examples of classification results using the post-processing operation in accordance with one or more embodiments of the present technology. Here, FIG. 10B corresponds to FIG. 7C and FIG. 10D corresponds to FIG. 8C. The misclassified areas 701, 801 are corrected after applying the phase discontinuity. FIGS. 11A-11F show effectiveness of the post-processing operation using two examples in accordance with one or more embodiments of the present technology. FIG. 11A shows an initial network output (multiple of integers) corresponding to FIG. 7A. Using this output, the corresponding unwrapped phase includes corrupted regions as shown in FIG. 7C. FIG. 11B shows an output after the post-processing operation and FIG. 11C shows the corresponding ground-truth. The misclassified regions in FIG. 11A are removed in FIG. 11B given the additional information about phase discontinuity. Consequently, the corresponding unwrapped phase (as shown in FIG. 7B) no longer includes the corrupted region. Similarly, FIG. 11D shows an initial network output corresponding to FIG. 8A. The corresponding unwrapped phase includes corrupted regions as shown in FIG. 8C. FIG. 11E shows an output after the post-processing operation and FIG. 11F shows the corresponding ground-truth. The misclassified regions in FIG. 11D no longer exist in FIG. 11B, and the corresponding unwrapped phase (as shown in FIG. 8B) no longer includes the corrupted regions.

De-Noising

As discussed above, various types of noises can be present in the phase-wrapped input. It is thus desirable to perform noise reduction (also known as denoising) on the noisy wrapped phase. Again, a neural network can be trained to perform denoising. In practice, clean training data can be difficult to obtain. Simulated noisy data, however, may not provide a good representation of the noises present in the real data. To address this problem, a noise-to-noise strategy can be used—that is, a neural network can be trained to identify noise using noisy training data only.

In some embodiments, a set of phase-shifted interferograms is obtained using a reference mirror positioned at different locations for measuring the phase. In order to obtain interferograms with minimal noise, for each of the reference mirror position, two interferograms are obtained at different times (e.g., sequentially). These two interferograms are substantially identical but with different noises and can be used as inputs to the noise-to-noise denoised network to obtain a clean interferogram.

Because image details are very important for performing phase unwrapping, in some embodiments, pooling layers and up-sampling convolutions can be removed. Zero padding can be used to keep the sizes of all feature maps (including the output image) the same. In some embodiments, a constant kernel size of 3-by-3 and a constant filter number of 64 for all convolutional layers are chosen. Two observations of noisy wrapped phases for each group and 500×2 groups of data are cropped into small patches with a size of 40-by-40 to train the network.

Figure 12A:
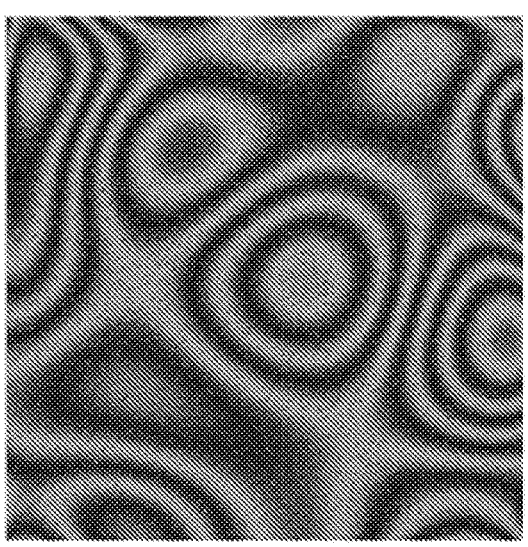
FIG. 12A illustrates an example of noisy wrapped phase input.
Figure 12B:
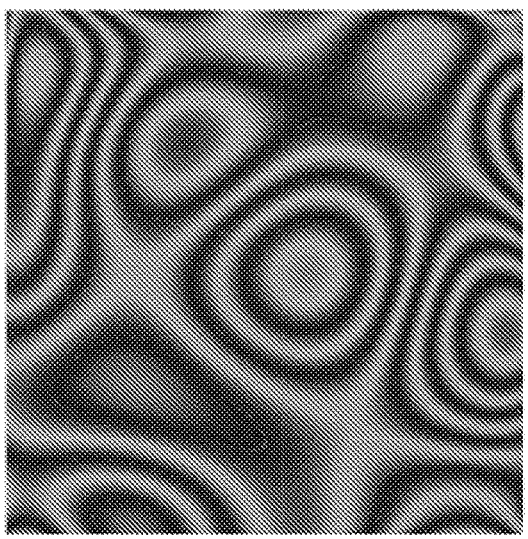
FIG. 12B illustrates an example of denoised wrapped phase based on the input shown in FIG. 12A in accordance with one or more embodiments of the present technology.
Figure 12C:
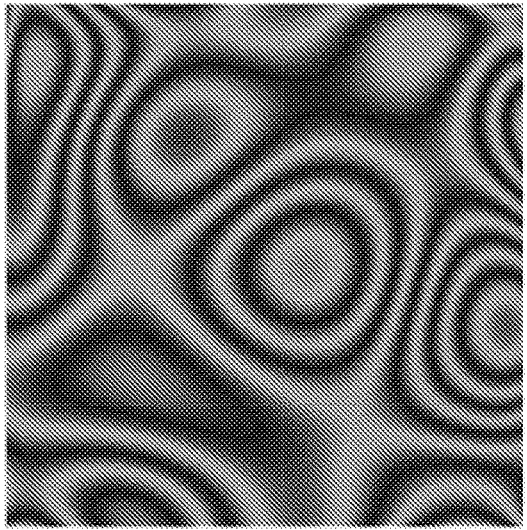
FIG. 12C illustrates an example ground-truth of wrapped phase corresponding to FIG. 12A.
Figure 12D:
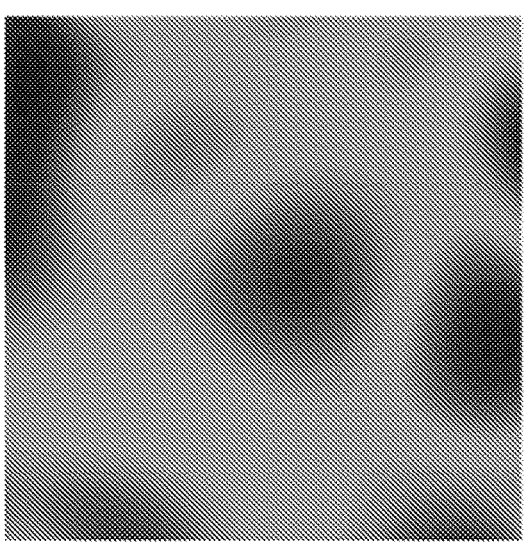
FIG. 12D illustrates an example of reconstructed unwrapped phase based on the input shown in FIG. 12A in accordance with one or more embodiments of the present technology.
Figure 12E:
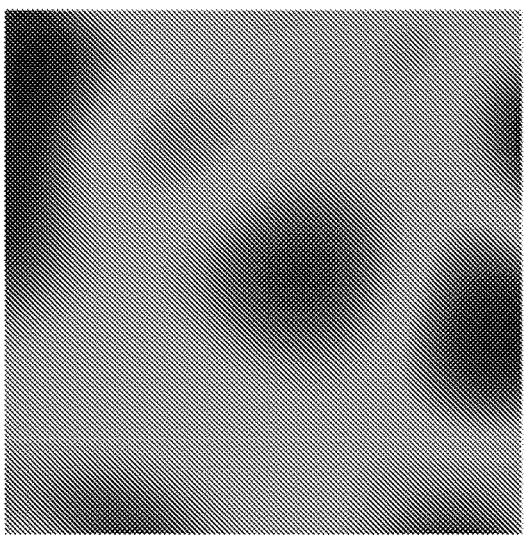
FIG. 12E illustrates an example ground-truth of unwrapped phase corresponding to FIG. 12D.
Figure 12F:
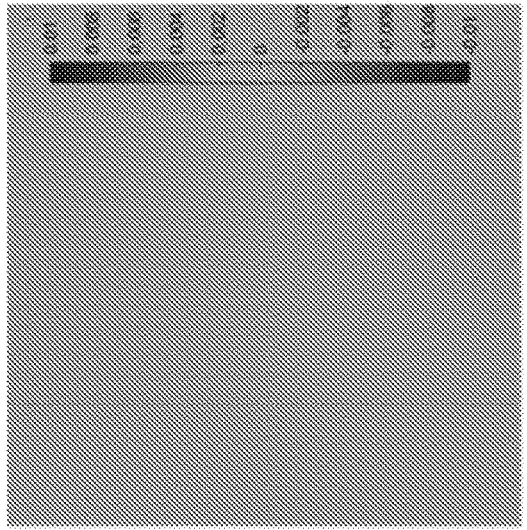
FIG. 12F illustrates an example difference between the reconstructed unwrapped phase shown in FIG. 12D and the corresponding ground-truth shown in FIG. 12E.

FIGS. 12A-12F show an example of denoising result based on simulated noise in accordance with one or more embodiments of the present technology. In this example, a combination of Poisson and Salt-Pepper random noise is added to interferograms before obtaining the noisy wrapped phase input shown in FIG. 12A. The denoised wrapped phase and the corresponding ground-truth are shown in FIG. 12B and FIG. 12C, respectively. Post-processing and smooth constraint were used to reconstruct unwrapped phase due to noisy contours of wrapped phase. The reconstructed unwrapped phase is shown in FIG. 12D. The corresponding ground-truth is shown in FIG. 12E. As shown in FIG. 12F, the difference between the reconstructed unwrapped phase and the ground-truth is small.

FIGS. 13A-13F show another example of denoising result based on simulated noise in accordance with one or more embodiments of the present technology. In this example, the noise level has been increased to produce more badly corrupted input data as shown in FIG. 13A. The denoised wrapped phase and the corresponding ground-truth are shown in FIG. 13B and FIG. 13C, respectively. The reconstructed unwrapped phase is shown in FIG. 13D. The corresponding ground-truth is shown in FIG. 13E. As shown in FIG. 13F, the difference between the reconstructed unwrapped phase and the ground-truth is larger due to the increasing level of noise. However, because the errors are distributed discretely, it is easy to reduce the impact of the noise by using techniques such as a low pass filter.

FIGS. 14A-14H show two examples of denoising result based on real noise in accordance with one or more embodiments of the present technology. FIG. 14A and FIG. 14E represent wrapped phases obtained by an interferometer setup such as shown in FIG. 1. FIG. 14B and FIG. 14F show the reconstructed unwrapped phases. FIG. 14C and FIG. 14G show the corresponding ground-truths. The differences between these two are shown in FIG. 14D and FIG. 14H. Similar to the results in FIG. 13F, the errors are distributed discretely, thus it is easy to reduce the impact of the noise by using techniques such as a low pass filter.

Figure 15:
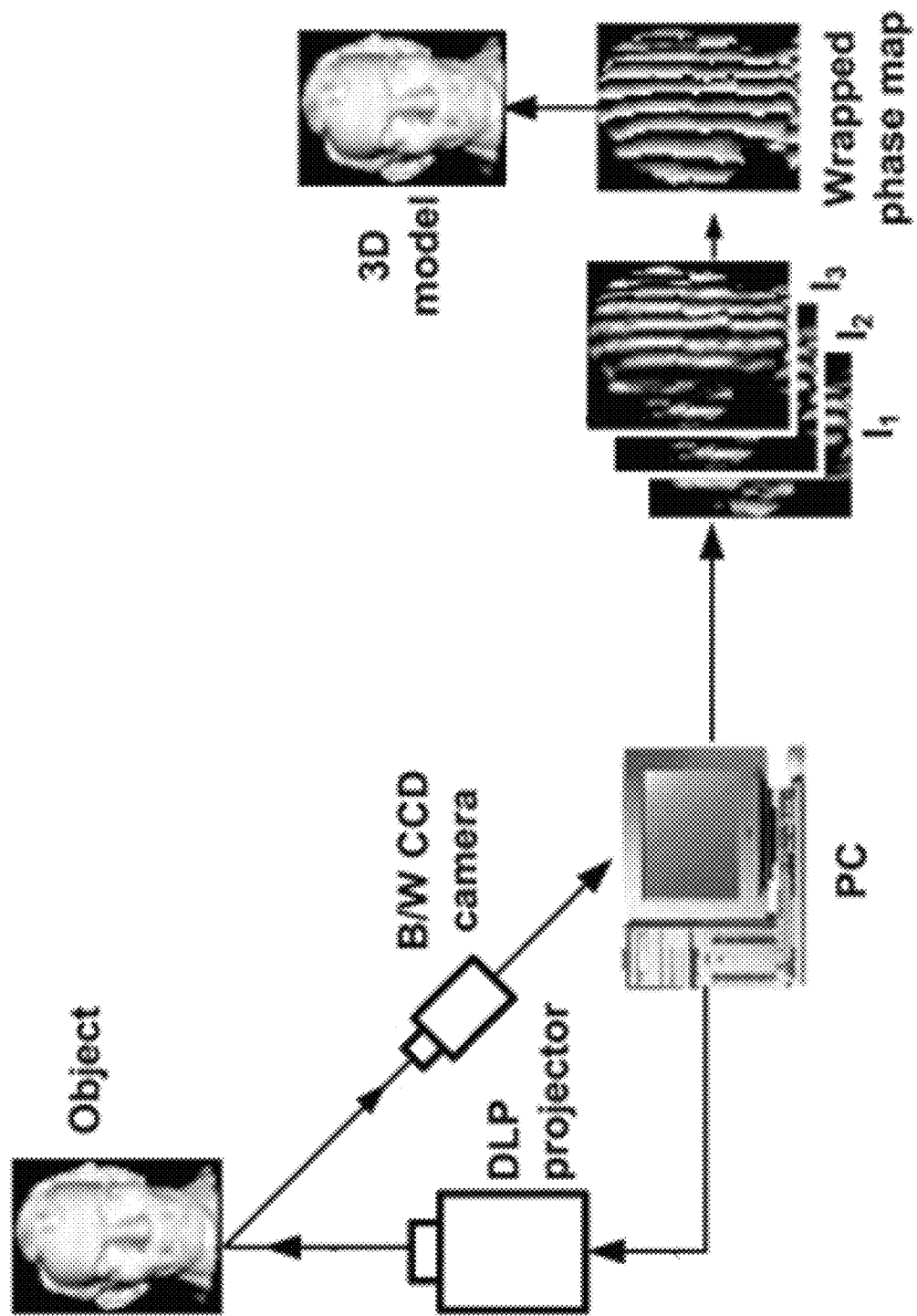
FIG. 15 illustrates an example of setup for fringe projection in three-dimensional (3D) metrology in accordance with one or more embodiments of the present technology.

Exemplary Applications: While FIG. 1 illustrates formation of interferograms in an interferometer setup, it is understood that the disclosed embodiments find many applications in different technologies that can benefit from resolving phase ambiguities. One example application is shown in FIG. 15, which illustrates an example of setup for fringe projection in three-dimensional (3D) metrology in accordance with one or more embodiments of the present technology.

Figure 18A:
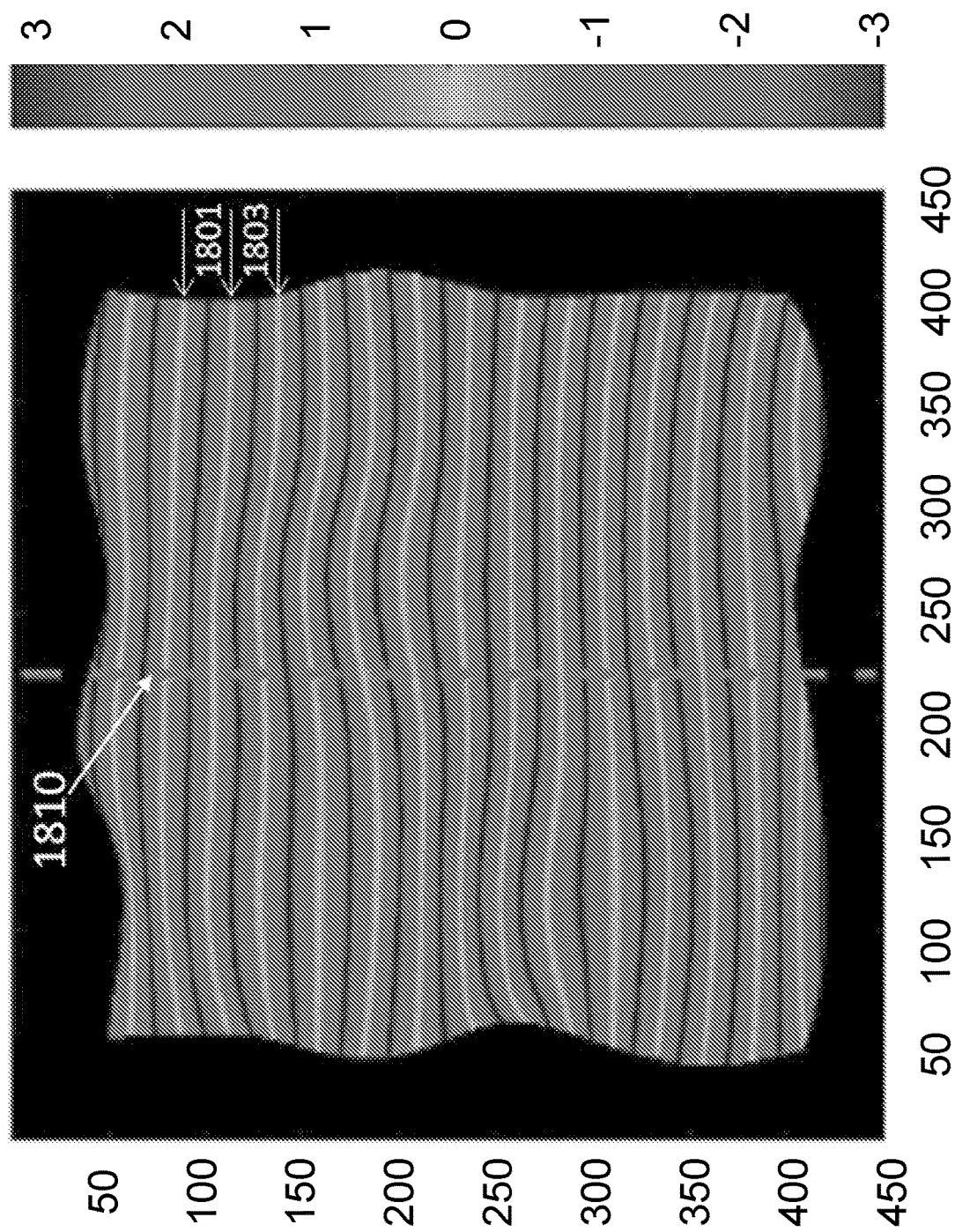
FIG. 18A illustrates an example wrapped phase of a random 3D surface obtained using fringe projection.
Figure 18B:
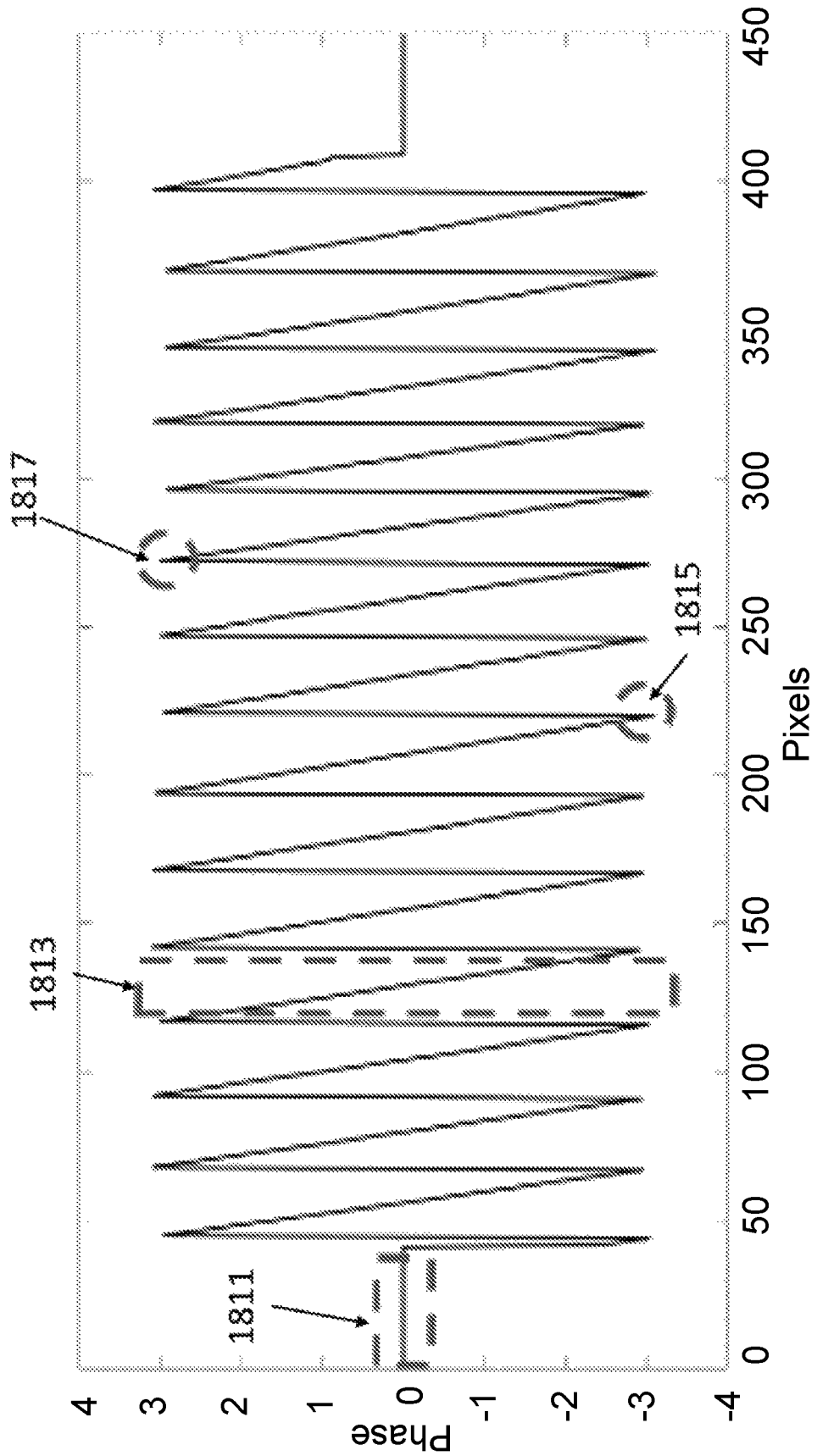
FIG. 18B illustrates an example plot of the phase distribution of one column indicated by a dash line in FIG. 18A.
Figure 18C:
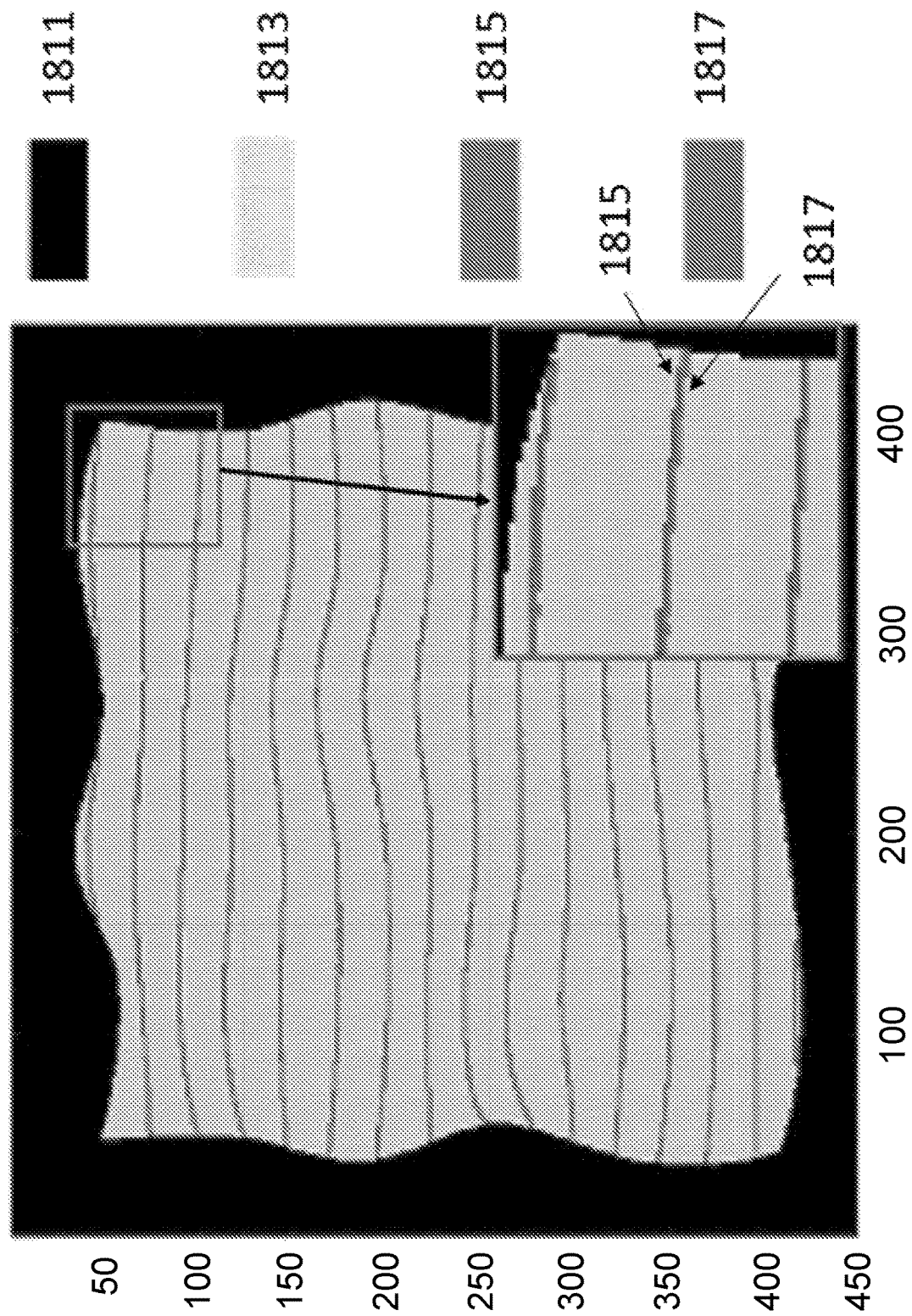
FIG. 18C illustrates an example plot of the segmented wrapped phase labeled with four features corresponding to FIG. 18A.

To develop an effective phase unwrapping neural network, the specific properties of the wrapped phase in fringe projection need to be considered. FIG. 18A illustrates an example wrapped phase of a random 3D surface obtained using fringe projection. In FIG. 18A, each wrapped period (e.g., 1801, 1803) looks similar, and there are little features to distinguish different periods. FIG. 18B illustrates an example plot of the phase distribution of one column indicated by the dash line 1810 in FIG. 18A. There are four features which can be used for unwrapping phase: background (1811), segmented phase region (1813), bottom turning point for the phase (1815) and peak turning point for the phase (1817). FIG. 18C illustrates an example plot of the segmented wrapped phase labeled with four features. The background 1811 is shown in black in FIG. 18C and the segmented phase region 1813 is shown in light grey. The bottom turning point 1815 and the peak turning point 1817 are located closely to each other as indicated by the arrows.

Directly adopting the segmentation neural network as shown in FIG. 5 may not yield good results as fringe projection inputs may have a variable number of wrapped periods. As discussed above, there are little features to distinguish one period from the other periods. Therefore, a neural network such as shown in FIG. 9 or FIG. 5 can be used first to identify the phase discontinuities and label the features in the phase discontinuities shown in FIG. 18B. A second similar neural network (e.g., as shown in FIG. 5) can be used to perform the segmentation and label each segment based on which phase period each pixel is located in.

Figure 19:
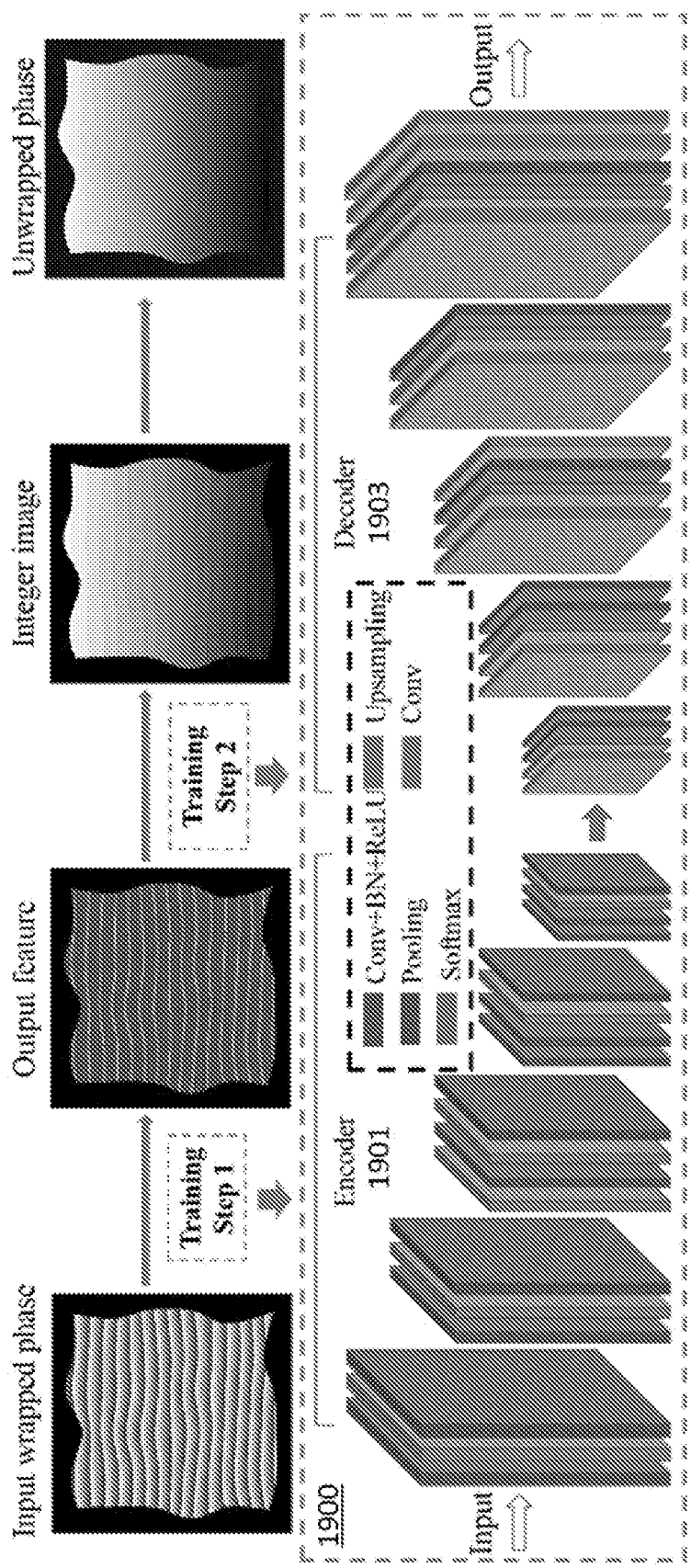
FIG. 19 illustrates an example workflow and architecture of a neural network to perform phase unwrapping for fringe projection in accordance with one or more embodiments of the present disclosure.

FIG. 19 illustrates an example workflow and architecture of a neural network to perform phase unwrapping for fringe projection in accordance with one or more embodiments of the present disclosure. The network 1900 includes an encoder path 1901, a decoder path 1903 and a pixel-wise classification layer (not shown). The encoder path 1901 has five layers, and each layer has operations of convolution (Cony), batch normalization (BN), rectified linear unit (Relu) and max-pooling for down-sampling. Likewise, the decoder path 1903 also has five layers corresponding to the encoder path. The difference in the decoder path is the up-sampling operation. The up-sample maps are realized by using the corresponding memorized max-pooling indices in the encoder path. In some embodiments, both the encoder path and the decoder path have 13 convolutional layers. The 13 convolution layers can be the same first 13 layers in the VGG16 classification network. The data output from the decoder path is then fed into another convolutional layer and finally output is obtained after a soft-max classifier. In some embodiments, the network 1900 is similar to the example networks shown in FIG. 5 and FIG. 9.

As shown in FIG. 19, the same network architecture can be used twice with different outputs. In Step I, a first network (e.g., similar to network 900 as shown in FIG. 9) is trained label the input. The output is the 4-label segmented image. In Step II, a second network (e.g., similar to network 500 as shown in FIG. 5) is trained to assign the segmented image to the integer label. Finally, using Eq. (3), the unwrapped phase can be determined. One major advantage of this architecture is that only four labels are used to characterize the wrapped phase information in Step 1. The number of wrapped phase regions can be unlimited. In addition, the size of the image can be variable as well.

Figure 20E:
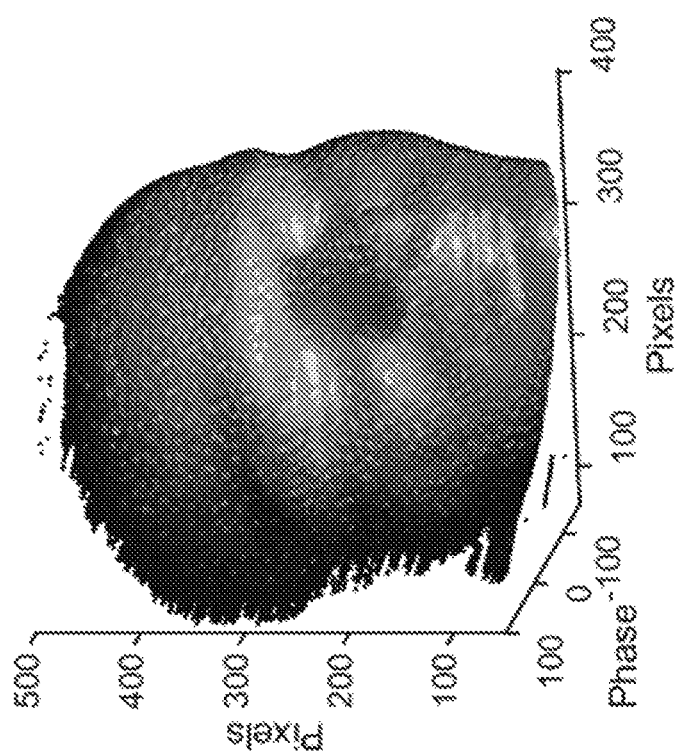
FIG. 20E illustrates a three-dimensional (3D) surface of a human head model reconstructed from the results in FIG. 20D.

FIG. 20A an example of fringe projection input obtained using a human head model. In this example input, the number of the wrapped phase segments is 30, which can be much larger than the number of wrapped phase segments in the training dataset. FIG. 20B illustrates an output phase feature map with corresponding labels in accordance with one or more embodiments of the present disclosure. FIG. 20C illustrates an example integer map determined based on the fringe projection input shown in FIG. 20A and the phase feature map shown in FIG. 20B in accordance with one or more embodiments of the present disclosure. FIG. 20D illustrates the final unwrapped phase in accordance with one or more embodiments of the present disclosure. FIG. 20E further illustrates a 3D surface of a human head model reconstructed from the results in FIG. 20D. The reconstructed image can include more detailed information because the sinusoidal fringe period is smaller.

The above discussed techniques can be used for surface reconstruction applications, e.g., to reconstruct a 3D surface using phase maps, or determination of a depth profile of a 3-dimensional object based on projected fringes. It is also noted that while the discussions herein focus on metrology applications, the techniques can be applied to other areas where interferometry is used, including but are not limited to surface profiling, microfluidics, mechanical stress/strain measurement, velocimetry, and optometry.

Figure 16:
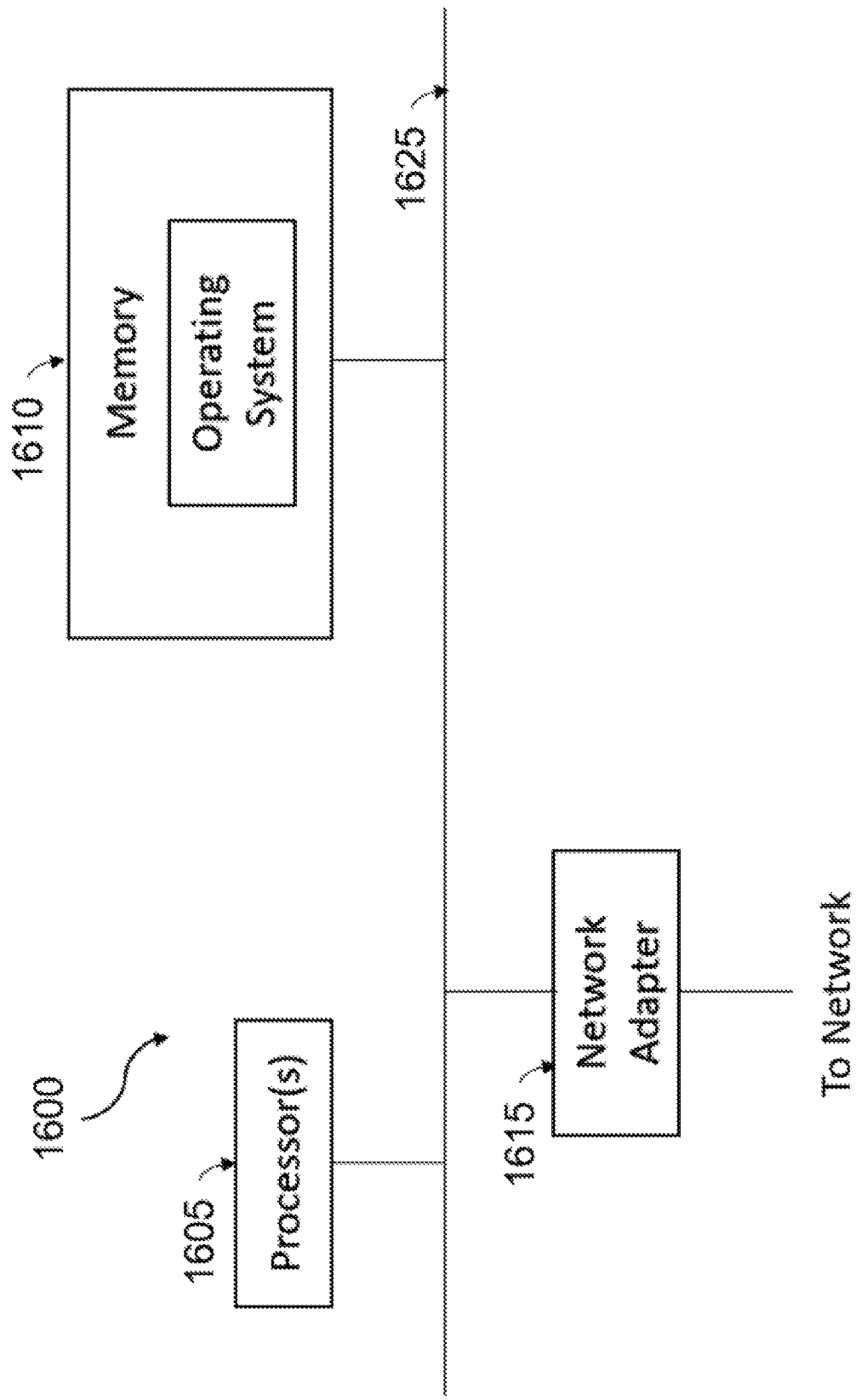
FIG. 16 is a block diagram illustrating an example of the architecture for a computer system or other control device that can be utilized to implement various portions of the presently disclosed technology.

FIG. 16 is a block diagram illustrating an example of the architecture for a computer system or other control device 1600 that can be utilized to implement various portions of the presently disclosed technology. In FIG. 16, the computer system 1600 includes one or more processors 1605 and memory 1610 connected via an interconnect 1625. The interconnect 1625 may represent any one or more separate physical buses, point to point connections, or both, connected by appropriate bridges, adapters, or controllers. The interconnect 1625, therefore, may include, for example, a system bus, a Peripheral Component Interconnect (PCI) bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 674 bus, sometimes referred to as "Firewire."

The processor(s) 1605 may include central processing units (CPUs), graphics processing units (GPUs), or other types of processing units (such as tensor processing units) to control the overall operation of, for example, the host computer. In certain embodiments, the processor(s) 1605 accomplish this by executing software or firmware stored in memory 1610. The processor(s) 1605 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The memory 1610 can be or include the main memory of the computer system. The memory 1610 represents any suitable form of random access memory (RAM), read-only memory (ROM), flash memory, or the like, or a combination of such devices. In use, the memory 1610 may contain, among other things, a set of machine instructions which, when executed by processor 1605, causes the processor 1605 to perform operations to implement embodiments of the presently disclosed technology.

Also connected to the processor(s) 1605 through the interconnect 1625 is a (optional) network adapter 1615. The network adapter 1615 provides the computer system 1600 with the ability to communicate with remote devices, such as the storage clients, and/or other storage servers, and may be, for example, an Ethernet adapter or Fiber Channel adapter.

Figure 17:
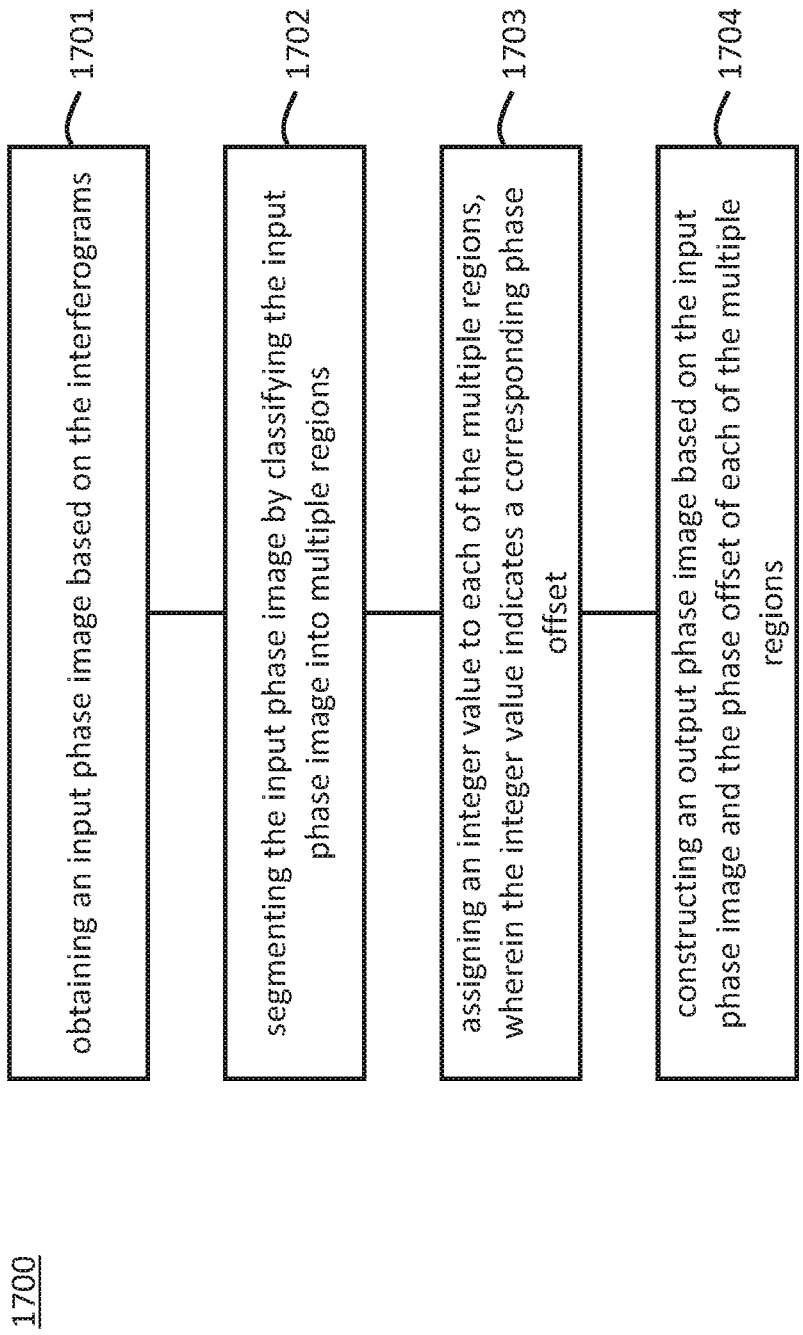
FIG. 17 is a flowchart representation of a method for processing interferograms in metrology applications in accordance with one or more embodiments of the present technology.

The disclosed embodiments provide significant improvements over the existing systems by providing fast and reliable phase unwrapping in interferometry. FIG. 17 is a flowchart representation of a method 1700 for processing interferograms in metrology applications in accordance with one or more embodiments of the present technology. The method 1700 includes, at step 1701, obtaining an input phase image based on the interferograms. Each pixel of the input phase image is associated with a phase value. The method 1700 includes, at step 1702, segmenting the input phase image by classifying the input phase image into multiple regions based on the phase value of each pixel. The method 1700 includes, at step 1703, assigning an integer value to each of the multiple regions. The integer value indicates that a corresponding region has a phase offset equal to a product of $2\pi$ and the integer value. The method 1700 includes, at step 1704, constructing an output phase image based on the phase value of each pixel of the input phase image and the phase offset of each of the multiple regions.

In some embodiments, the multiple regions and the integer value corresponding to each of the multiple regions are determined by a neural network. In some embodiments, the neural network includes a convolutional neural network. In some embodiments, the convolutional neural network includes a first set of layers for at least one of a convolution operation, a batch normalization operation, or a rectified linear unit. In some embodiments, wherein the convolutional neural network includes a layer for performing a max pooling operation after the first set of layers. In some embodiments, a number of layers used in the convolutional neural network corresponds to a size of the input phase image.

In some embodiments, the method includes identifying, based on the phase value and the location of each pixel, one or more phase discontinuities in the input phase image. The method also includes adjusting the multiple regions or the integer value corresponding to each of the multiple regions based on the one or more phase discontinuities.

In some embodiments, the method includes denoising the input phase image by using a neural network that is trained using only noisy data. In some embodiments, the deformed fringes are obtained by projecting a set of pre-defined fringes on an object.

In some embodiments, the method includes obtaining a first set of phase-shifted interferograms with a reference mirror positioned at different locations. Two interferograms are obtained at each location of the reference mirror at different times. The method includes denoising the first set of phase-shifted interferograms by a second neural network to obtain a second set of phase-shifted interferograms. The method also includes obtaining the input phase image based on the second set of phase-shifted interferograms.

In some embodiments, the method includes obtaining a first set of deformed fringes by projecting fringes on surfaces of an object. Two deformed fringes are obtained at each projected fringe at different times. The method includes denoising the first set of deformed fringes by a second neural network to obtain a second set of deformed fringes. The method also includes obtaining the input phase image based on the second set of deformed fringes.

In some embodiments, segmenting the input phase image comprises identifying, based on the phase value and the location of each pixel, one or more phase discontinuities in the input phase image; assigning a label to each pixel based on the one or more phase discontinuities, the label indicating that the pixel is in one of: a background region, a segmented phase region, a phase turning region at a bottom, or a phase turning region at a top; and classifying the input phase image into the multiple regions based on the phase value and the number of phase periods. In some embodiments, the one or more phase discontinuities are identified by a third neural network having a same architecture as the neural network used to determine the multiple regions.

In some embodiments, the method includes determining surface characteristics of an optical component based on the output phase image. In some embodiments, the method includes determining surface characteristics of an object based on the output phase image. In some embodiments, the method includes reconstructing a three-dimensional surface based on the output phase image.

In another example aspect, a device for performing optical system design includes one or more processors and a memory including processor-executable instructions stored thereon. The processor-executable instructions, upon execution by the one or more processors, configure the one or more processors to obtain an input phase image based on the interferograms or the deformed fringes, each pixel of the input phase image associated with a phase value; segment the input phase image by classifying the input phase image into multiple regions based on the phase value and a location of each pixel; assign an integer value to each of the multiple regions; and construct an output phase image based on the phase value of each pixel and the phase offset of each of the multiple regions. The integer value indicates that a corresponding region has a phase offset equal to a product of $2\pi$ and the integer value.

In some embodiments, the multiple regions and the integer value corresponding to each of the multiple regions are determined by a neural network. In some embodiments, the neural network includes a convolutional neural network. In some embodiments, the convolutional neural network includes a first set of layers for at least one of a convolution operation, a batch normalization operation, or a rectified linear unit. In some embodiments, the convolutional neural network includes a layer for performing a max pooling operation after the first set of layers. In some embodiments, a number of layers used in the convolutional neural network corresponds to a size of the input phase image.

In some embodiments, the one or more processors are further configured to identify, based on the phase value and the location of each pixel, one or more phase discontinuities in the input phase image; and adjust the multiple regions or the integer value corresponding to each of the multiple regions based on the one or more phase discontinuities. In some embodiments, the one or more processors are further configured to denoise the input phase image by using a neural network that is trained using only noisy data. In some embodiments, the deformed fringes are obtained by projecting a set of pre-defined fringes on an object. In some embodiments, the one or more processors are further configured to obtain a first set of phase-shifted interferograms with a reference mirror positioned at different locations, wherein two interferograms are obtained at each location of the reference mirror at different times; denoise the first set of phase-shifted interferograms by a second neural network to obtain a second set of phase-shifted interferograms; and obtain the input phase image based on the second set of phase-shifted interferograms. In some embodiments, the one or more processors are further configured to obtain a first set of deformed fringes by projecting fringes on surfaces of an object, wherein two deformed fringes are obtained at each projected fringe at different times; denoise the first set of deformed fringes by a second neural network to obtain a second set of deformed fringes; and obtain the input phase image based on the second set of deformed fringes.

In some embodiments, the one or more processors are further configured to segment the input phase image by identifying, based on the phase value and the location of each pixel, one or more phase discontinuities in the input phase image; assigning a label to each pixel based on the one or more phase discontinuities, the label indicating that the pixel is in one of: a background region, a segmented phase region, a phase turning region at a bottom, or a phase turning region at a top; and classifying the input phase image into the multiple regions based on the phase value and the number of phase periods. In some embodiments, the one or more phase discontinuities are identified by a third neural network having a same architecture as the neural network used to determine the multiple regions.

In some embodiments, the one or more processors are further configured to determine surface characteristics of an optical component based on the output phase image. In some embodiments, the one or more processors are further configured to determine surface characteristics of an object based on the output phase image. In some embodiments, the one or more processors are further configured to reconstruct a three-dimensional surface based on the output phase image.

In yet another example aspect, a non-transitory computer readable medium having code stored thereon that is executable by a processor is disclosed. The code, when executed by a processor, causes the processor to implement a method that comprises obtaining an input phase image based on the interferograms or the deformed fringes, wherein each pixel of the input phase image is associated with a phase value; segmenting the input phase image by classifying the input phase image into multiple regions based on the phase value and a location of each pixel; assigning an integer value to each of the multiple regions, wherein the integer value indicates that a corresponding region has a phase offset equal to a product of $2\pi$ and the integer value; and constructing an output phase image based on the phase value of each pixel and the phase offset of each of the multiple regions. The code, when executed by a processor, can also cause the processor to implement any of the above-mentioned methods.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, e.g., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method for processing interferograms or deformed fringes, comprising:
    obtaining an input phase image based on the interferograms or the deformed fringes, wherein each pixel of the input phase image is associated with a phase value;
    segmenting the input phase image by classifying the input phase image into multiple regions based on the phase value and a location of each pixel, wherein the multiple regions are determined by a neural network;
    assigning an integer value to each of the multiple regions, wherein the integer value indicates that a corresponding region has a phase offset equal to a product of $2\pi$ and the integer value, wherein the integer value corresponding to each of the multiple regions is determined by the neural network; and
    constructing an output phase image based on the phase value of each pixel and the phase offset of each of the multiple regions.

2. The method of claim 1, wherein the neural network includes a convolutional neural network.

3. The method of claim 2, wherein the convolutional neural network includes a first set of layers for at least one of a convolution operation, a batch normalization operation, or a rectified linear unit.

4. The method of claim 3, wherein the convolutional neural network includes a layer for performing a max pooling operation after the first set of layers.

5. The method of claim 2, wherein a number of layers used in the convolutional neural network corresponds to a size of the input phase image.

6. The method of claim 1, comprising:
    identifying, based on the phase value and the location of each pixel, one or more phase discontinuities in the input phase image; and
    adjusting the multiple regions or the integer value corresponding to each of the multiple regions based on the one or more phase discontinuities.

7. The method of claim 1, comprising:
    denoising the input phase image by using a neural network that is trained using only noisy data.

8. The method of claim 1, wherein the deformed fringes are obtained by projecting a set of pre-defined fringes on an object.

9. The method of claim 1, comprising:
obtaining a first set of phase-shifted interferograms with a reference mirror positioned at different locations, wherein two interferograms are obtained at each location of the reference mirror at different times;
denoising the first set of phase-shifted interferograms by a second neural network to obtain a second set of phase-shifted interferograms; and
obtaining the input phase image based on the second set of phase-shifted interferograms.

10. The method of claim 1, comprising:
obtaining a first set of deformed fringes by projecting fringes on surfaces of an object, wherein two deformed fringes are obtained at each projected fringe at different times;
denoising the first set of deformed fringes by a second neural network to obtain a second set of deformed fringes; and
obtaining the input phase image based on the second set of deformed fringes.

11. The method of claim 1, wherein segmenting the input phase image comprises:
identifying, based on the phase value and the location of each pixel, one or more phase discontinuities in the input phase image;
assigning a label to each pixel based on the one or more phase discontinuities, the label indicating that the pixel is in one of: a background region, a segmented phase region, a phase turning region at a bottom, or a phase turning region at a top; and
classifying the input phase image into the multiple regions based on the phase value and the number of phase periods.

12. The method of claim 11, wherein the one or more phase discontinuities are identified by a third neural network having a same architecture as the neural network used to determine the multiple regions.

13. The method of claim 1, comprising:
determining surface characteristics of an optical component based on the output phase image.

14. The method of claim 1, comprising:
determining surface characteristics of an object based on the output phase image.

15. The method of claim 1, comprising:
reconstructing a three-dimensional surface based on the output phase image.

16. A device for performing optical system design, comprising:
one or more processors; and
a memory including processor-executable instructions stored thereon, the processor-executable instructions upon execution by the one or more processors configure the one or more processors to:
obtain an input phase image based on the interferograms or the deformed fringes, wherein each pixel of the input phase image is associated with a phase value;
segment the input phase image by classifying the input phase image into multiple regions based on the phase value and a location of each pixel, wherein the multiple regions are determined by a neural network;
assign an integer value to each of the multiple regions, wherein the integer value indicates that a corresponding region has a phase offset equal to a product of $2\pi$ and the integer value, wherein the integer value corresponding to each of the multiple regions is determined by the neural network; and
construct an output phase image based on the phase value of each pixel and the phase offset of each of the multiple regions.

17. The device of claim 16, wherein the neural network includes a convolutional neural network.

18. The device of claim 17, wherein the convolutional neural network includes a first set of layers for at least one of a convolution operation, a batch normalization operation, or a rectified linear unit.

19. The device of claim 18, wherein the convolutional neural network includes a layer for performing a max pooling operation after the first set of layers.

20. The device of claim 16, wherein a number of layers used in the convolutional neural network corresponds to a size of the input phase image.

21. The device of claim 16, wherein the one or more processors are further configured to:
identify, based on the phase value and the location of each pixel, one or more phase discontinuities in the input phase image; and
adjust the multiple regions or the integer value corresponding to each of the multiple regions based on the one or more phase discontinuities.

22. The device of claim 16, wherein the one or more processors are further configured to:
denoise the input phase image by using a neural network that is trained using only noisy data.

23. The device of claim 16, wherein the deformed fringes are obtained by projecting a set of pre-defined fringes on an object.

24. The device of claim 16, wherein the one or more processors are further configured to:
obtain a first set of phase-shifted interferograms with a reference mirror positioned at different locations, wherein two interferograms are obtained at each location of the reference mirror at different times;
denoise the first set of phase-shifted interferograms by a second neural network to obtain a second set of phase-shifted interferograms; and
obtain the input phase image based on the second set of phase-shifted interferograms.

25. The device of claim 16, wherein the one or more processors are further configured to:
obtain a first set of deformed fringes by projecting fringes on surfaces of an object, wherein two deformed fringes are obtained at each projected fringe at different times;
denoise the first set of deformed fringes by a second neural network to obtain a second set of deformed fringes; and
obtain the input phase image based on the second set of deformed fringes.

26. The device of claim 16, wherein the one or more processors are further configured to segment the input phase image by:
identifying, based on the phase value and the location of each pixel, one or more phase discontinuities in the input phase image;
assigning a label to each pixel based on the one or more phase discontinuities, the label indicating that the pixel is in one of: a background region, a segmented phase region, a phase turning region at a bottom, or a phase turning region at a top; and classifying the input phase image into the multiple regions based on the phase value and the number of phase periods.

27. The device of claim 26, wherein the one or more phase discontinuities are identified by a third neural network having a same architecture as the neural network used to determine the multiple regions.

28. The device of claim 16, wherein the one or more processors are further configured to:
    determine surface characteristics of an optical component based on the output phase image.

29. The device of claim 16, wherein the one or more processors are further configured to:
    determine surface characteristics of an object based on the output phase image.

30. The device of claim 16, wherein the one or more processors are further configured to:
    reconstruct a three-dimensional surface based on the output phase image.

31. A non-transitory computer readable medium having code stored thereon that is executable by a processor, wherein the code, when executed by a processor, causes the processor to implement a method that comprises:
    obtaining an input phase image based on the interferograms or the deformed fringes, wherein each pixel of the input phase image is associated with a phase value;
    segmenting the input phase image by classifying the input phase image into multiple regions based on the phase value and a location of each pixel, wherein the multiple regions are determined by a neural network;
    assigning an integer value to each of the multiple regions, wherein the integer value indicates that a corresponding region has a phase offset equal to a product of $2\pi$ and the integer value, wherein the integer value corresponding to each of the multiple regions is determined by the neural network; and
    constructing an output phase image based on the phase value of each pixel and the phase offset of each of the multiple regions.

* * * * *